US008360898B2

(12) United States Patent
Huang

(10) Patent No.: US 8,360,898 B2
(45) Date of Patent: Jan. 29, 2013

(54) GRIP

(76) Inventor: Ben Huang, Huntington Beach, CA (US)

( * ) Notice: Subject to any disclaimer, the term of this patent is extended or adjusted under 35 U.S.C. 154(b) by 250 days.

(21) Appl. No.: 12/767,736

(22) Filed: Apr. 26, 2010

(65) Prior Publication Data

US 2011/0065524 A1   Mar. 17, 2011

Related U.S. Application Data

(63) Continuation-in-part of application No. 11/838,670, filed on Aug. 14, 2007, now Pat. No. 7,862,446, and a continuation-in-part of application No. 12/425,187, filed on Apr. 16, 2009, now abandoned, which is a continuation of application No. 11/412,196, filed on Apr. 25, 2006, now abandoned, which is a continuation of application No. 10/167,216, filed on Jun. 11, 2002, now Pat. No. 7,137,904.

(51) Int. Cl.
    *A63B 53/14* (2006.01)
(52) U.S. Cl. ........................................ 473/300
(58) Field of Classification Search ........... 473/300–303
    See application file for complete search history.

(56) References Cited

U.S. PATENT DOCUMENTS

| 571,025 A | 11/1896 | Spanner |
| 834,711 A | 10/1906 | Clarke et al. |
| 979,266 A | 12/1910 | Dean |
| 1,008,604 A | 11/1911 | Lake |
| 1,017,565 A | 2/1912 | Lard |
| 1,139,843 A | 5/1915 | Brown |
| 1,345,505 A | 7/1920 | Persons |
| 1,435,088 A | 11/1922 | Smith |
| 1,522,635 A | 1/1924 | Kraeuter |
| 1,528,190 A | 3/1925 | Howe |
| 1,617,972 A | 2/1927 | Wallace |
| 1,701,856 A | 2/1929 | Kraeuter |
| 1,890,037 A | 11/1930 | Johnson |
| 1,943,399 A | 1/1934 | Smith |
| 2,000,295 A | 5/1935 | Oldham |
| 2,086,062 A | 7/1937 | Bray |
| 2,103,889 A | 12/1937 | Brisick |
| 2,115,119 A | 4/1938 | Park |
| 2,149,911 A | 3/1939 | East |
| 2,206,056 A | 7/1940 | Sheesley |
| 2,221,421 A | 11/1940 | Curry |
| 2,225,839 A | 12/1940 | Moore |
| 2,449,575 A | 9/1948 | Wilhelm |
| 2,523,637 A | 9/1950 | Stanfield et al. |
| 2,671,660 A | 3/1954 | Goodwin |

(Continued)

FOREIGN PATENT DOCUMENTS

| CN | 2139008 Y | 7/1993 |
| CN | 2163667 Y | 5/1994 |

(Continued)

OTHER PUBLICATIONS

U.S. Appl. No. 12/948,637, filed Nov. 17, 2010, pending.

(Continued)

*Primary Examiner* — Stephen L. Blau
(74) *Attorney, Agent, or Firm* — Knobbe Martens Olson & Bear LLP

(57) ABSTRACT

The disclosure herein includes a grip for a golf club with a flexible tube and a layered sheet. The tube includes a tubular body and raised portions extending from the tubular body. The outer surface of the raised portions cooperates with the layered sheet to form a gripping surface. The grip reduces impact shock and provides a feeling of tackiness while providing increased variation in the physical characteristics of the gripping surface. The disclosure further provides a golf club grip that includes a resilient strip spirally wrapped about an underlisting sleeve having a cap and a nipple. The underside of the cap is formed a downwardly facing circumferential slot that receives the upper edge of the strip. The nipple is formed with an upwardly facing groove that receives the lower portion of the strip.

18 Claims, 25 Drawing Sheets

U.S. PATENT DOCUMENTS

| | | |
|---|---|---|
| 2,690,338 A | 9/1954 | Brocke |
| 2,772,090 A | 11/1956 | Brandon |
| 2,934,285 A | 4/1960 | Niehaus |
| 2,984,486 A | 5/1961 | Jones |
| 3,028,283 A | 4/1962 | Lundgren et al. |
| 3,059,816 A | 10/1962 | Goldstein |
| 3,073,055 A | 1/1963 | Edwards et al. |
| 3,087,729 A | 4/1963 | Sullivan |
| 3,095,198 A | 6/1963 | Gasche |
| 3,140,873 A | 7/1964 | Goodwin |
| 3,157,723 A | 11/1964 | Hochberg |
| 3,311,375 A | 3/1967 | Onions |
| 3,366,384 A | 1/1968 | Lamkin et al. |
| 3,368,811 A | 2/1968 | Finney |
| 3,503,784 A | 3/1970 | Okayama et al. |
| 3,606,325 A | 9/1971 | Lamkin et al. |
| 3,697,315 A | 10/1972 | Mine |
| 3,857,745 A | 12/1974 | Grausch et al. |
| 3,876,320 A | 4/1975 | Phillipson |
| 3,922,402 A | 11/1975 | Shimamura et al. |
| 3,973,348 A | 8/1976 | Shell |
| 3,992,021 A | 11/1976 | Tobin |
| 4,012,039 A | 3/1977 | Yerke |
| 4,015,851 A | 4/1977 | Pennell |
| 4,052,061 A | 10/1977 | Stewart |
| 4,133,529 A | 1/1979 | Gambino |
| 4,137,360 A | 1/1979 | Reischl |
| 4,216,251 A | 8/1980 | Nishimura et al. |
| 4,284,275 A | 8/1981 | Fletcher |
| 4,347,280 A | 8/1982 | Lau et al. |
| 4,358,499 A | 11/1982 | Hill |
| 4,373,718 A | 2/1983 | Schmidt |
| 4,448,922 A | 5/1984 | McCartney |
| 4,453,332 A | 6/1984 | Wightman |
| 4,535,649 A | 8/1985 | Stahel |
| 4,582,459 A | 4/1986 | Benit |
| 4,613,537 A | 9/1986 | Krüpper |
| 4,651,991 A | 3/1987 | McDuff |
| 4,662,415 A | 5/1987 | Proutt |
| 4,765,856 A | 8/1988 | Doubt |
| 4,878,667 A | 11/1989 | Tosti |
| 4,919,420 A | 4/1990 | Sato |
| 4,941,232 A | 7/1990 | Decker et al. |
| 4,971,837 A | 11/1990 | Martz et al. |
| 5,024,866 A | 6/1991 | Goode |
| 5,055,340 A | 10/1991 | Matsumura et al. |
| 5,118,107 A | 6/1992 | Bucher |
| 5,123,646 A | 6/1992 | Overby et al. |
| 5,127,650 A | 7/1992 | Schneller |
| 5,261,665 A | 11/1993 | Downey |
| 5,322,290 A | 6/1994 | Minami |
| 5,343,776 A | 9/1994 | Falco et al. |
| 5,374,059 A | 12/1994 | Huang |
| 5,396,727 A | 3/1995 | Furuya et al. |
| 5,427,376 A | 6/1995 | Cummings et al. |
| 5,469,601 A | 11/1995 | Jackson |
| 5,474,802 A | 12/1995 | Shimoda et al. |
| 5,480,146 A | 1/1996 | Comer |
| 5,485,996 A | 1/1996 | Niksich |
| 5,511,445 A | 4/1996 | Hildebrandt |
| 5,537,773 A | 7/1996 | Matsubara et al. |
| 5,570,884 A | 11/1996 | Carps |
| 5,571,050 A | 11/1996 | Huang |
| 5,577,722 A | 11/1996 | Glassberg |
| 5,584,482 A | 12/1996 | Huang |
| 5,595,544 A | 1/1997 | Roelke |
| 5,611,533 A | 3/1997 | Williams |
| 5,624,116 A | 4/1997 | Yeh |
| 5,626,527 A | 5/1997 | Eberlein |
| 5,634,859 A | 6/1997 | Nesbitt |
| 5,645,501 A | 7/1997 | Huang |
| 5,671,923 A | 9/1997 | Huang |
| 5,690,566 A | 11/1997 | Bracho |
| 5,695,418 A | 12/1997 | Huang |
| 5,730,662 A | 3/1998 | Rens |
| 5,730,669 A | 3/1998 | Huang |
| 5,753,568 A | 5/1998 | Shimano et al. |
| 5,772,524 A | 6/1998 | Huang |
| 5,781,963 A | 7/1998 | Maru et al. |
| 5,797,813 A | 8/1998 | Huang |
| 5,803,828 A | 9/1998 | Huang |
| 5,813,921 A | 9/1998 | Huang |
| 5,816,933 A | 10/1998 | Huang |
| 5,816,934 A | 10/1998 | Huang |
| 5,827,129 A | 10/1998 | Huang |
| 5,839,983 A | 11/1998 | Kramer |
| 5,851,632 A | 12/1998 | Chen et al. |
| 5,857,929 A | 1/1999 | Huang |
| 5,867,868 A | 2/1999 | Ward |
| 5,890,260 A | 4/1999 | Gaunt |
| 5,890,972 A | 4/1999 | Huang |
| 5,895,329 A | 4/1999 | Huang |
| 5,910,054 A | 6/1999 | Huang |
| 5,924,941 A | 7/1999 | Hagey |
| 5,997,421 A | 12/1999 | Huang |
| 6,036,607 A | 3/2000 | Finegan |
| 6,048,275 A | 4/2000 | Gedeon |
| 6,148,482 A | 11/2000 | Maraman, Jr. |
| 6,197,392 B1 | 3/2001 | Jones |
| 6,226,836 B1 | 5/2001 | Yasui |
| 6,244,975 B1 | 6/2001 | Huang |
| 6,261,191 B1 | 7/2001 | Chen |
| 6,314,617 B1 | 11/2001 | Hastings |
| 6,360,475 B1 | 3/2002 | Lepage et al. |
| 6,361,450 B1 | 3/2002 | Huang |
| 6,386,989 B1 | 5/2002 | Huang |
| D463,520 S | 9/2002 | Ulrich |
| 6,449,803 B1 | 9/2002 | McConchie |
| 6,503,153 B2 | 1/2003 | Wang |
| 6,506,128 B1 | 1/2003 | Bloom, Jr. |
| 6,511,732 B1 | 1/2003 | Chao |
| 6,551,198 B2 | 4/2003 | Huang |
| 6,558,270 B2 | 5/2003 | Kwitek |
| 6,627,027 B2 | 9/2003 | Huang |
| 6,629,382 B2 | 10/2003 | Irrgang et al. |
| 6,629,901 B2 | 10/2003 | Huang |
| 6,635,688 B2 | 10/2003 | Simpson |
| 6,652,398 B2 | 11/2003 | Falone et al. |
| 6,656,054 B2 | 12/2003 | Ulrich |
| 6,656,057 B2 | 12/2003 | Manual et al. |
| 6,663,500 B2 | 12/2003 | Huang |
| 6,666,777 B1 | 12/2003 | Lamkin et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,827,656 B1 | 12/2004 | Hoeflich et al. |
| 6,843,732 B1 | 1/2005 | Huang |
| 6,857,971 B2 | 2/2005 | Huang |
| 6,908,400 B2 | 6/2005 | Chu et al. |
| 6,973,750 B1 | 12/2005 | Kim |
| 6,974,626 B2 | 12/2005 | Horacek |
| 7,008,582 B2 | 3/2006 | Chen |
| 7,048,644 B2 | 5/2006 | Wang |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| D538,868 S | 3/2007 | Norton et al. |
| D538,869 S | 3/2007 | Wang et al. |
| 7,186,189 B2 | 3/2007 | Huang |
| 7,195,568 B2 | 3/2007 | Huang |
| 7,219,395 B2 | 5/2007 | Bigolin |
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |
| 7,404,770 B2 | 7/2008 | Huang |
| 7,438,646 B2 | 10/2008 | Huang |
| 7,448,957 B2 | 11/2008 | Huang |
| 7,448,958 B2 | 11/2008 | Huang |

| | | |
|---|---|---|
| 7,458,903 B2 | 12/2008 | Wang et al. |
| 7,470,199 B2 | 12/2008 | Huang |
| 7,491,133 B2 | 2/2009 | Huang |
| 7,527,564 B2 | 5/2009 | Huang |
| 7,566,375 B2 | 7/2009 | Huang |
| 7,585,230 B2 | 9/2009 | Huang |
| 7,770,321 B2 | 8/2010 | Huang |
| 2002/0028264 A1 | 3/2002 | Hoopman et al. |
| 2002/0028325 A1 | 3/2002 | Simpson |
| 2002/0142858 A1 | 10/2002 | Chen |
| 2002/0142900 A1 | 10/2002 | Wang |
| 2002/0151373 A1 | 10/2002 | Beauregard |
| 2002/0173371 A1 | 11/2002 | Lamkin et al. |
| 2003/0040384 A1 | 2/2003 | Falone et al. |
| 2003/0045370 A1 | 3/2003 | Jaw |
| 2003/0062654 A1 | 4/2003 | Lamkin |
| 2003/0139223 A1 | 7/2003 | Ulrich et al. |
| 2003/0148836 A1 | 8/2003 | Falone et al. |
| 2003/0150081 A1 | 8/2003 | Wang |
| 2003/0216192 A1 | 11/2003 | Chu |
| 2003/0228930 A1 | 12/2003 | Huang |
| 2004/0029645 A1 | 2/2004 | Chen |
| 2004/0029646 A1 | 2/2004 | Chu et al. |
| 2004/0031128 A1 | 2/2004 | Chen |
| 2004/0109980 A1 | 6/2004 | Chen et al. |
| 2004/0123429 A1 | 7/2004 | Wang |
| 2004/0185958 A1 | 9/2004 | Huang |
| 2004/0248664 A1 | 12/2004 | Billings |
| 2004/0266546 A1 | 12/2004 | Huang |
| 2005/0123723 A1 | 6/2005 | Wang |
| 2005/0148401 A1 | 7/2005 | Huang |
| 2005/0229285 A1 | 10/2005 | Chung |
| 2005/0276925 A1 | 12/2005 | Su |
| 2005/0287329 A1 | 12/2005 | Lai |
| 2006/0172815 A1 | 8/2006 | Chu |
| 2006/0252571 A1 | 11/2006 | Wang |
| 2006/0264268 A1 | 11/2006 | Huang |
| 2006/0287123 A1 | 12/2006 | Wang |
| 2007/0149307 A1 | 6/2007 | Huang |
| 2008/0120893 A1 | 5/2008 | Keys et al. |
| 2008/0229646 A1 | 9/2008 | Huang |
| 2008/0230174 A1 | 9/2008 | Huang |
| 2008/0283178 A1 | 11/2008 | Huang |
| 2009/0025852 A1 | 1/2009 | Huang |
| 2009/0048036 A1 | 2/2009 | Huang |
| 2009/0258721 A1 | 10/2009 | Huang |
| 2009/0258722 A1 | 10/2009 | Huang |
| 2010/0022322 A1 | 1/2010 | Huang |
| 2011/0077100 A1 | 3/2011 | Huang |

FOREIGN PATENT DOCUMENTS

| | | |
|---|---|---|
| CN | 2288744 | 8/1998 |
| CN | 2090283 | 12/1999 |
| CN | 1332022 A | 7/2000 |
| CN | 2438768 | 7/2001 |
| CN | 2444645 | 8/2001 |
| CN | ZL 02254450.X | 9/2002 |
| CN | 2596752 | 1/2004 |
| CN | 2659497 | 12/2004 |
| DE | 92 18 550 U1 | 8/1994 |
| FR | 2 731 402 A3 | 9/1996 |
| GB | 2 192 550 A | 1/1988 |
| JP | 55-43008 | 3/1980 |
| JP | 3112575 | 5/1991 |
| JP | 7-41731 | 2/1995 |
| JP | 3081404 | 8/2001 |
| JP | 2002-028264 | 1/2002 |

OTHER PUBLICATIONS

The Random House College Dictionary, Revised Edition, 1975, p. 1233, definition of skive.
U.S. Appl. No. 12/753,804, filed Apr. 2, 2010, pending.
U.S. Appl. No. 12/753,669, filed Apr. 2, 2010, pending.
U.S. Appl. No. 12/753,799, filed Apr. 2, 2010, pending.
U.S. Appl. No. 12/753,773, filed Apr. 2, 2010, pending.
U.S. Appl. No. 12/767,736, filed Apr. 26, 2010, pending.
U.S. Appl. No. 12/848,052, filed Jul. 30, 2010, pending.
U.S. Appl. No. 12/862,673, filed Aug. 24, 2010, pending.
U.S. Appl. No. 13/208,297, filed Aug. 11, 2011, pending.

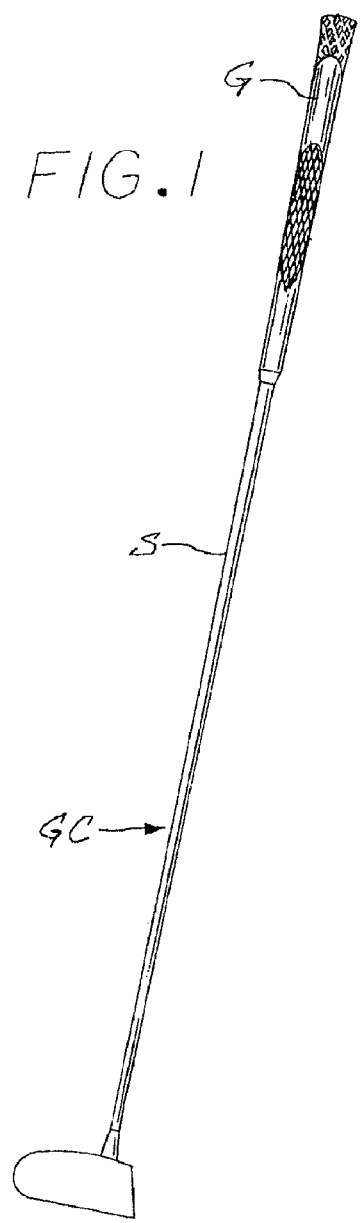
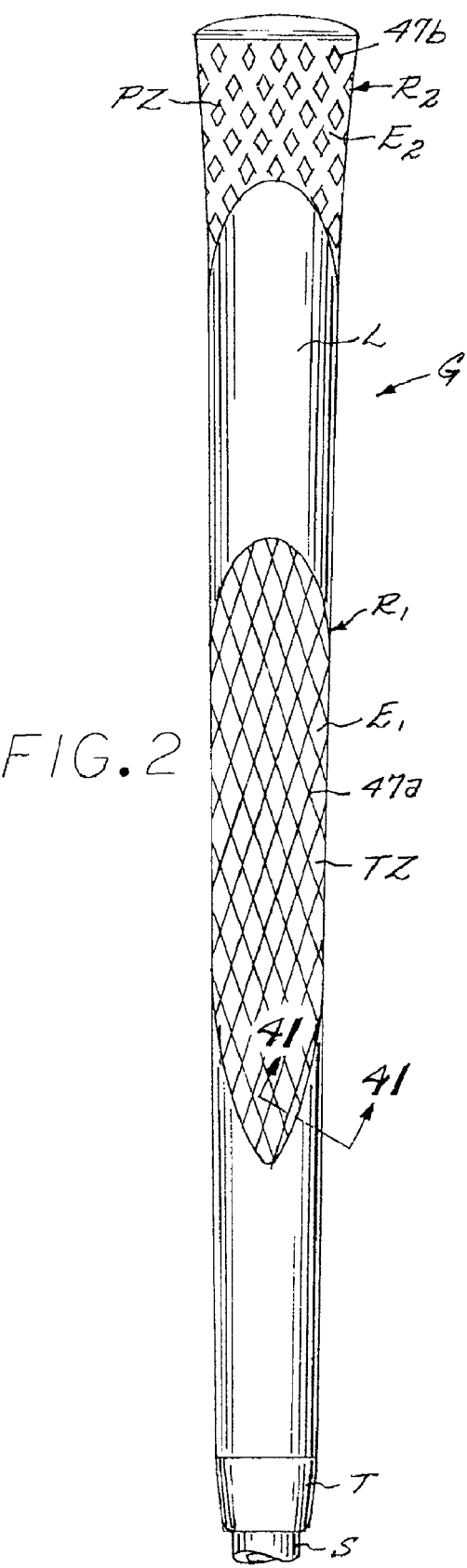
FIG.1
FIG.2

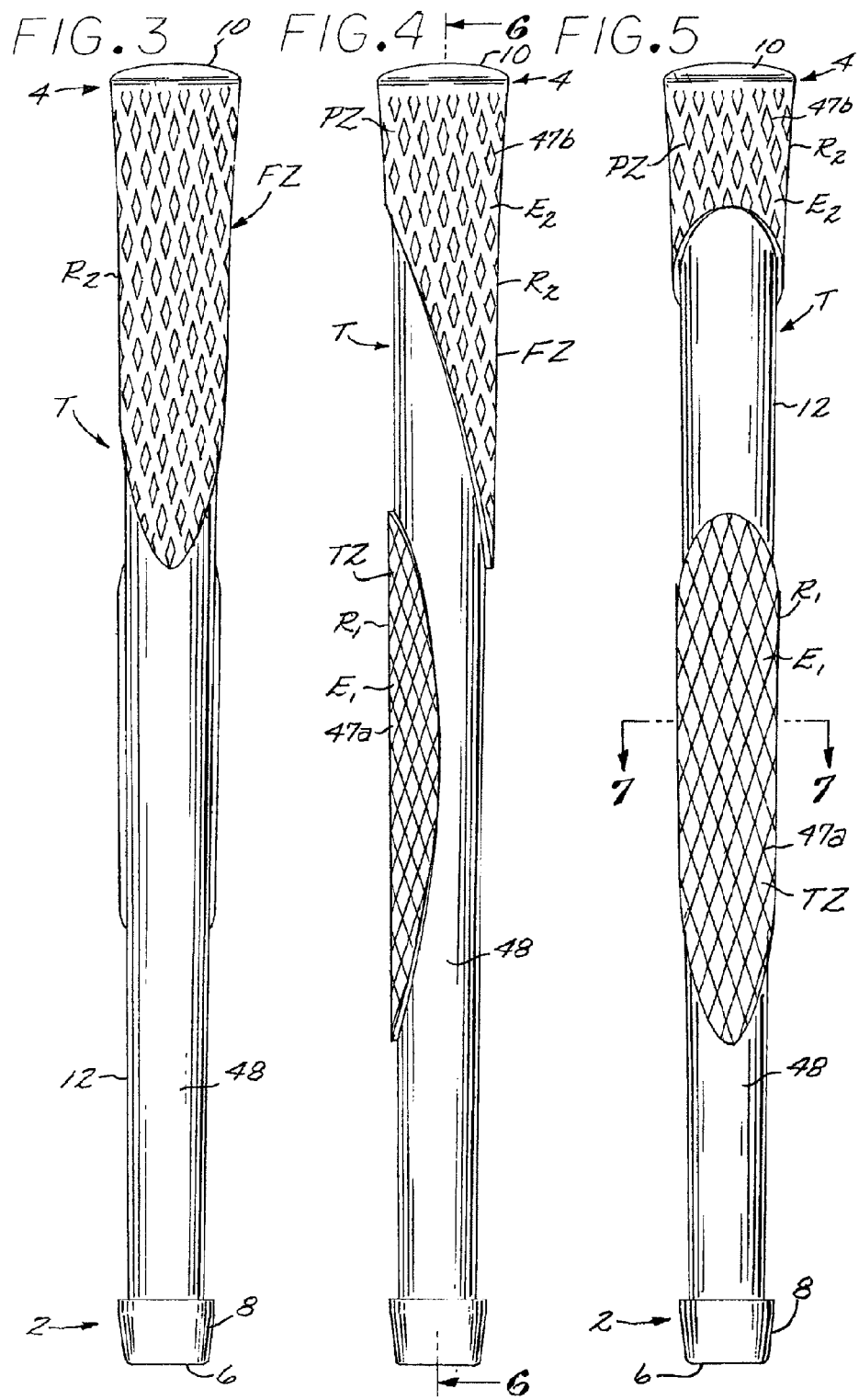

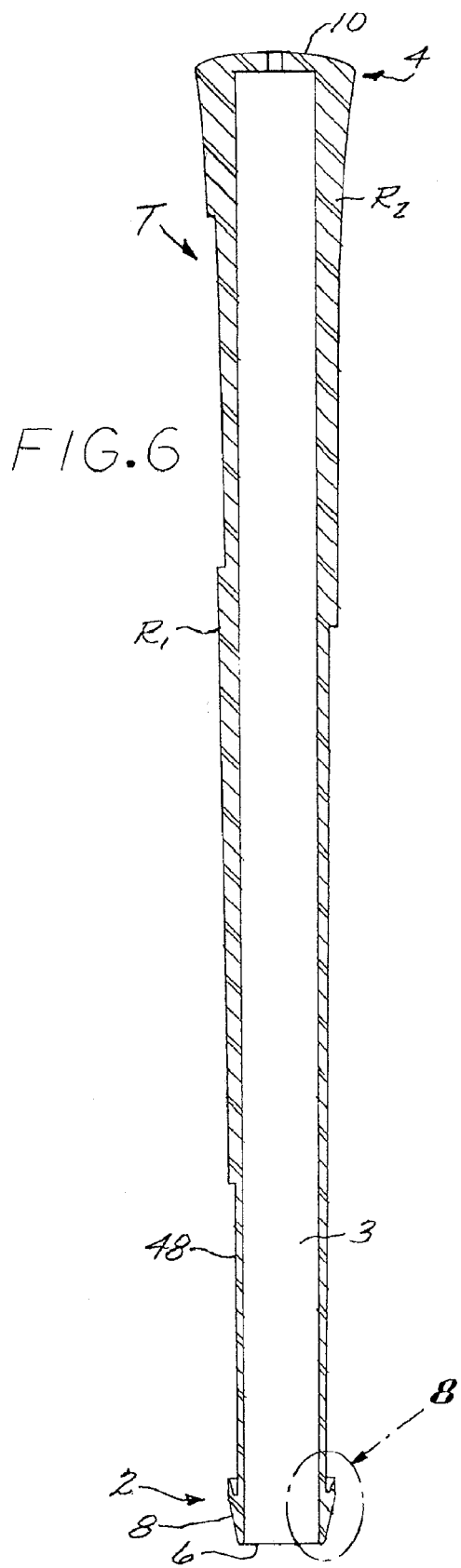
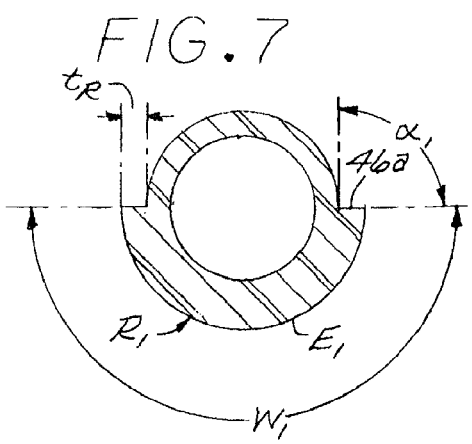
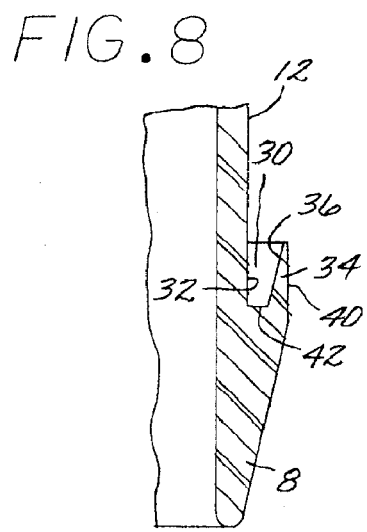
FIG.6
FIG.7
FIG.8

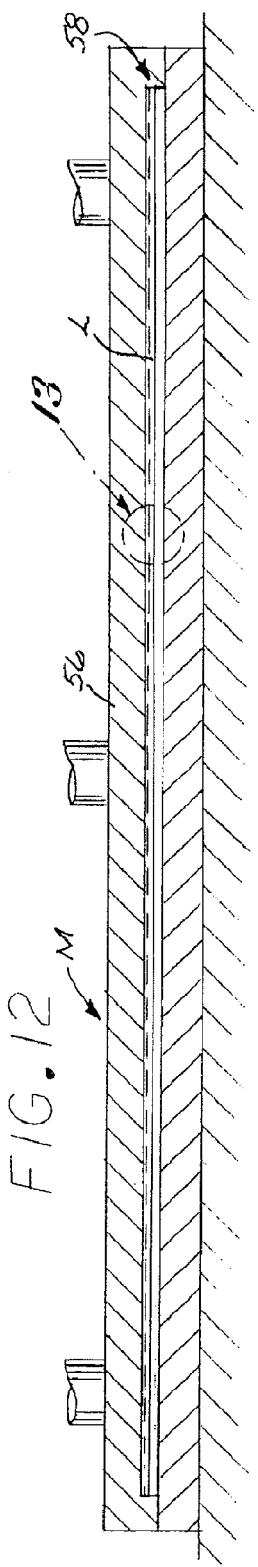

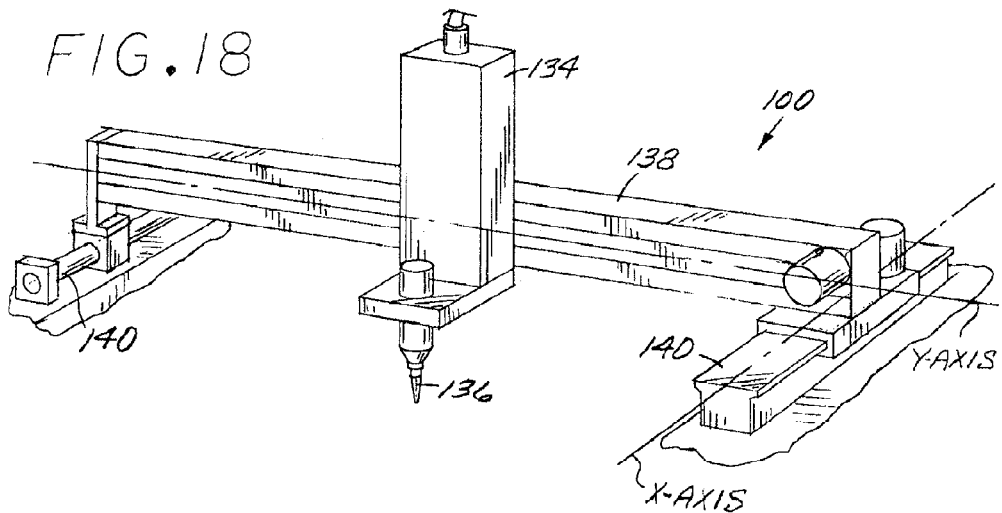
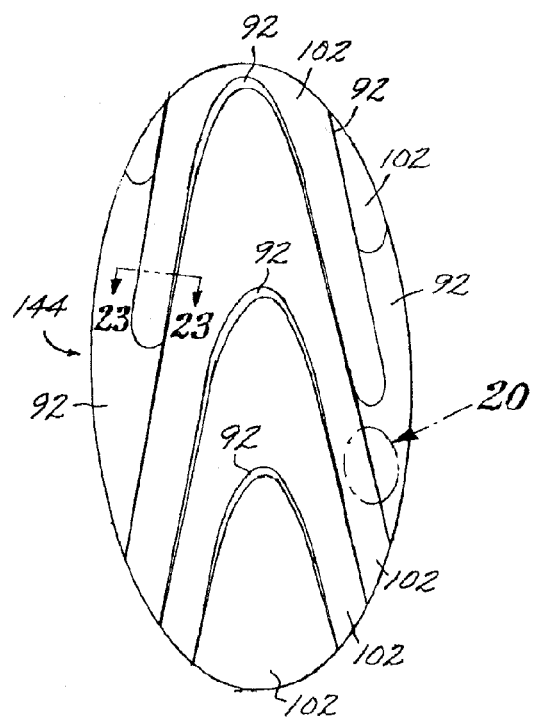
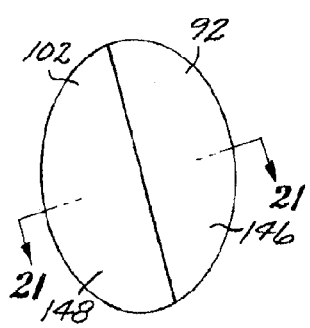

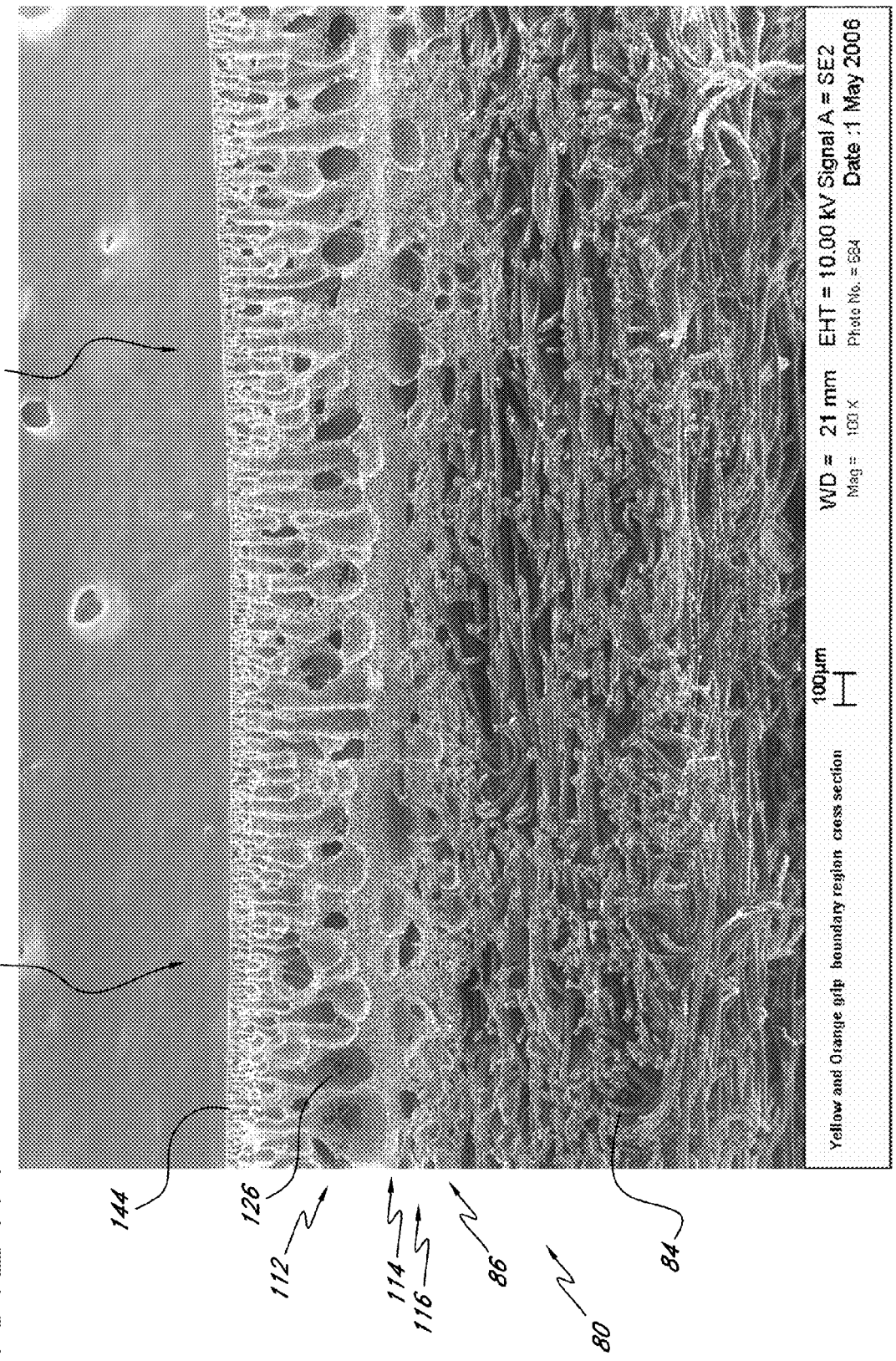

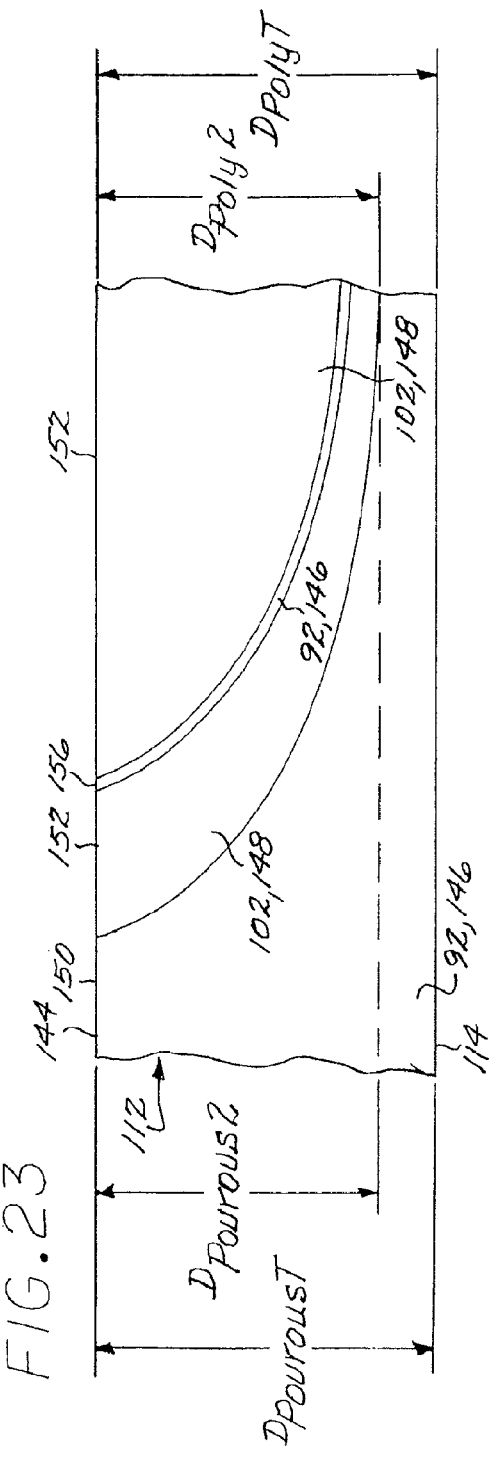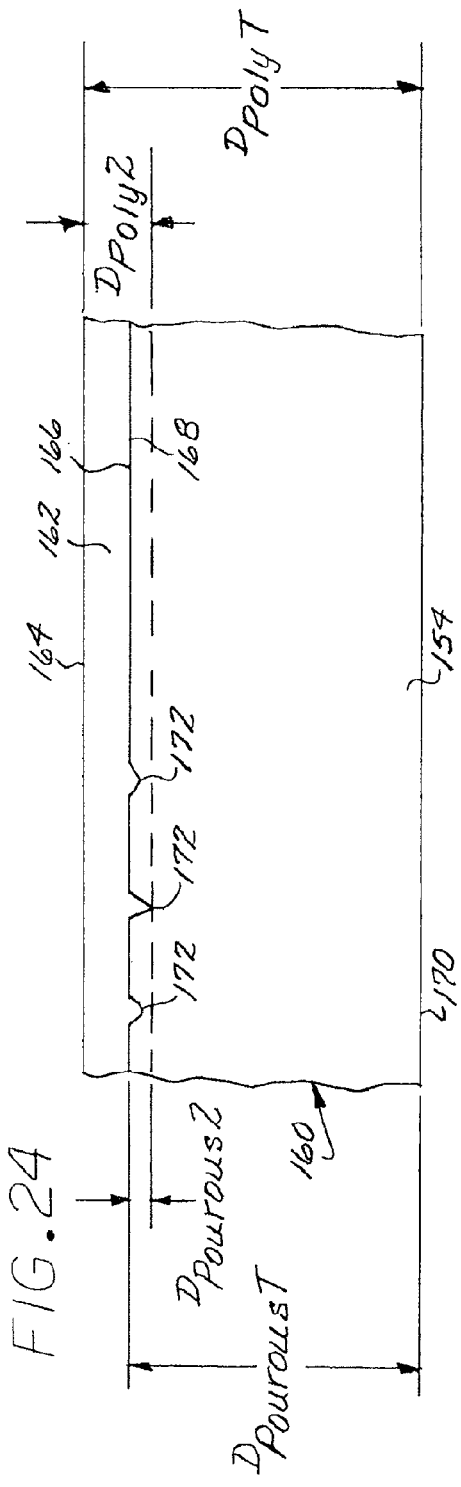

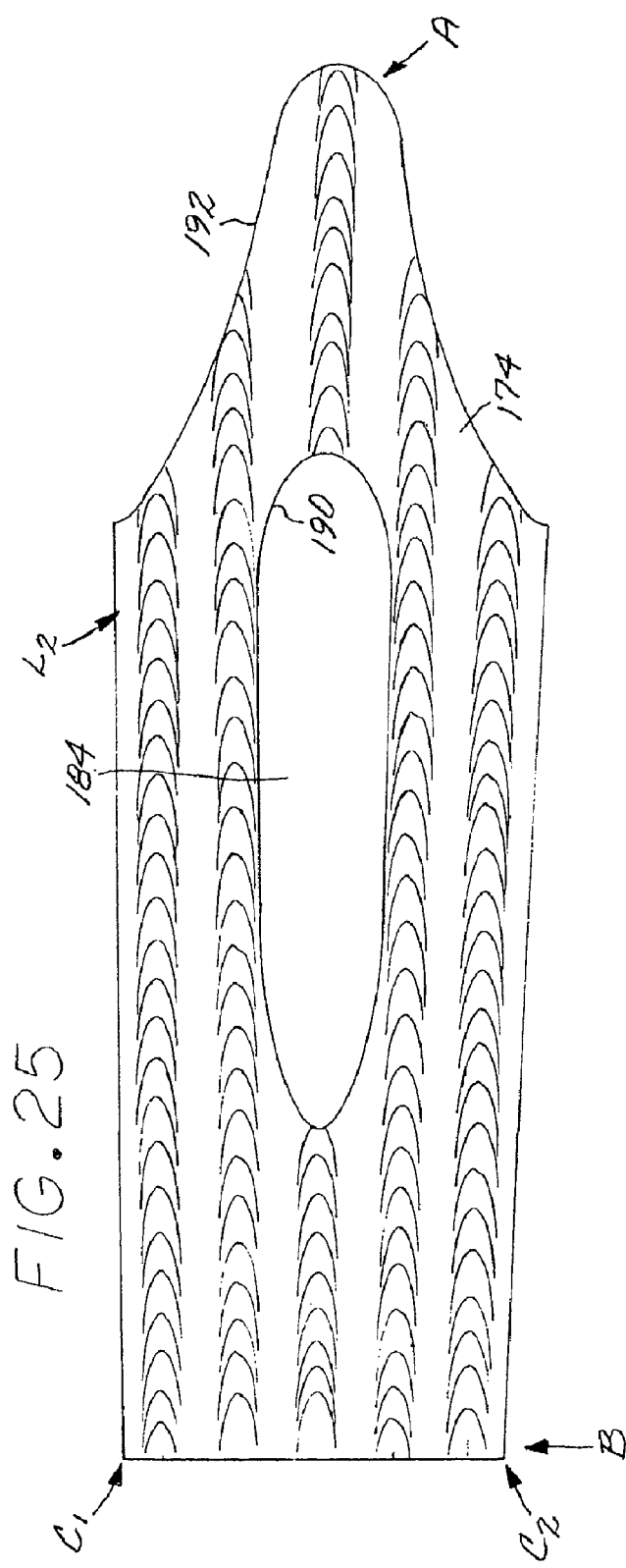
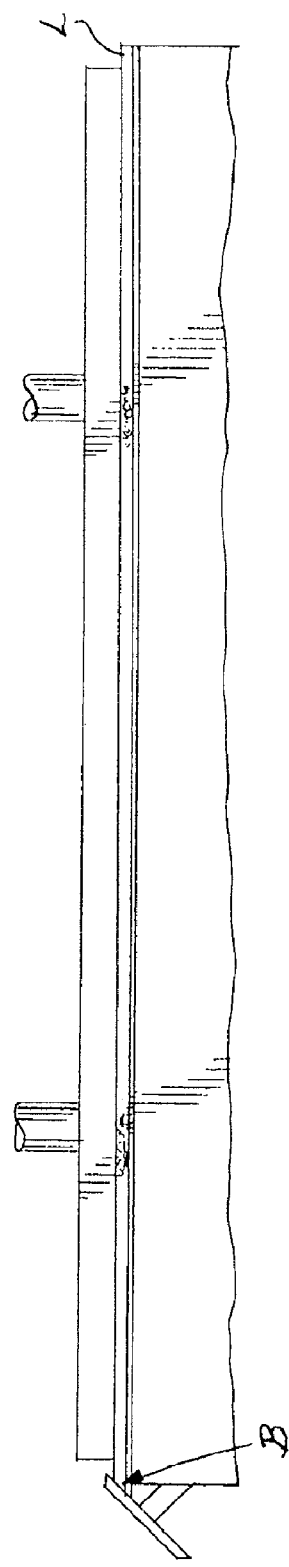

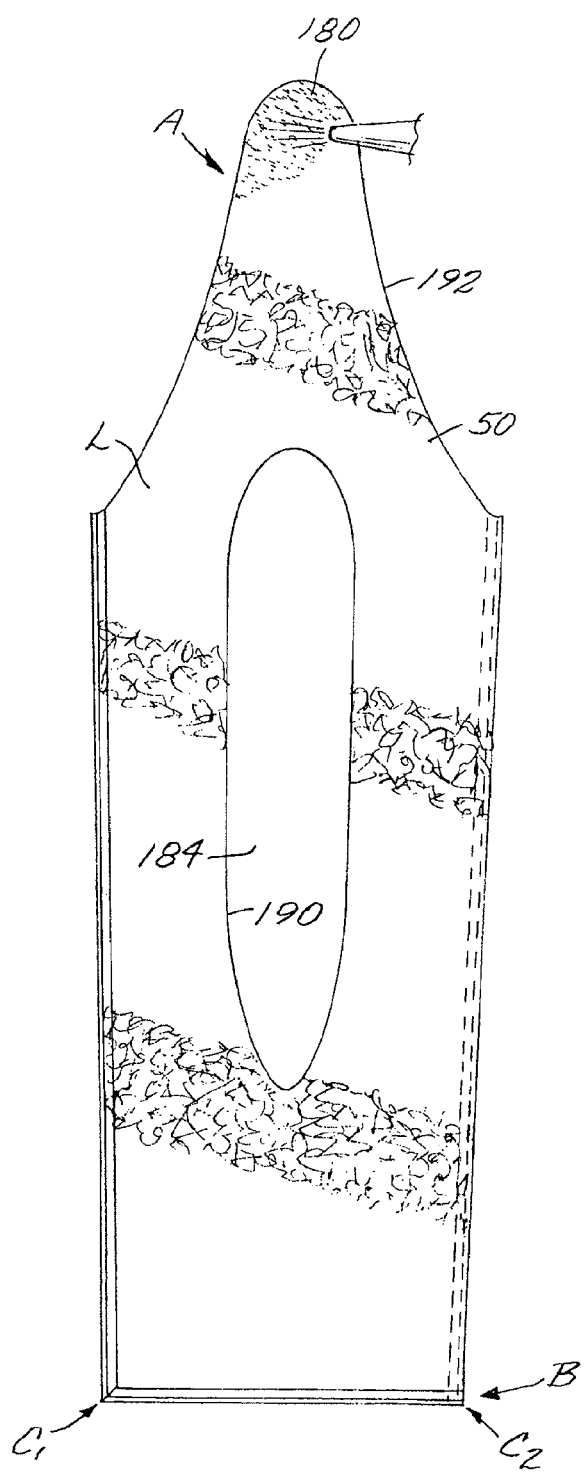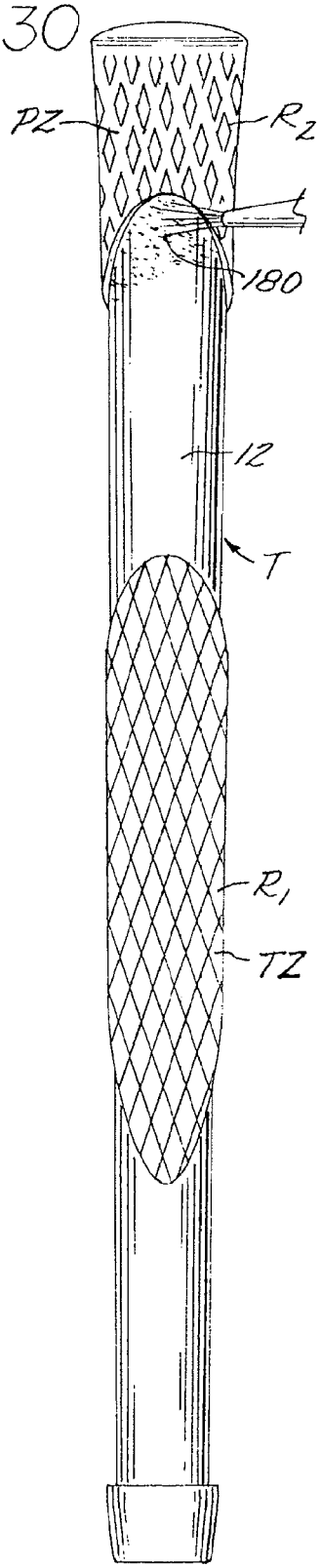

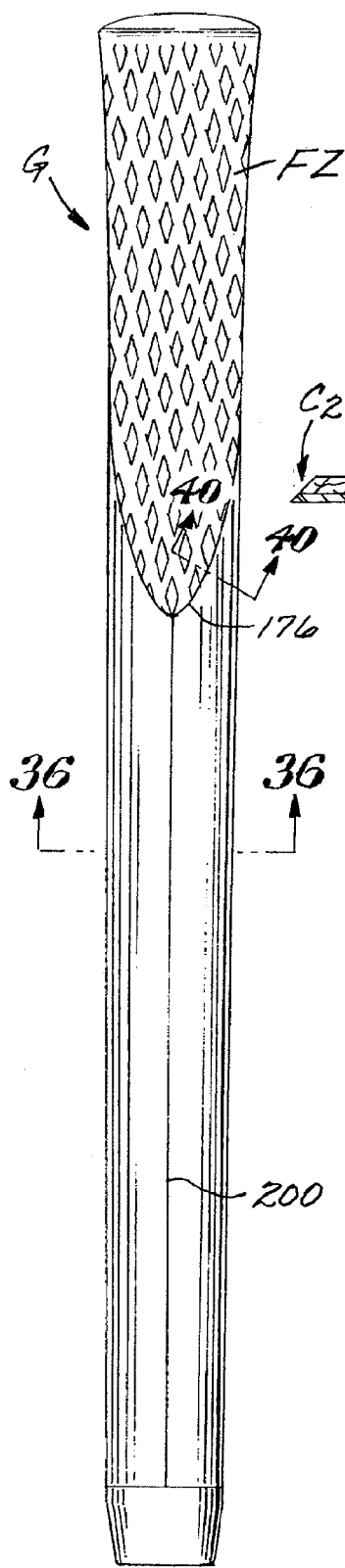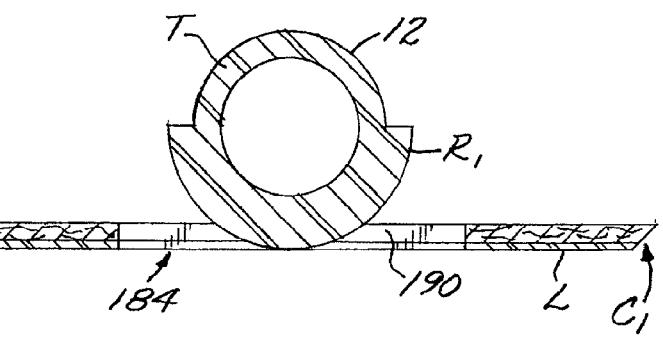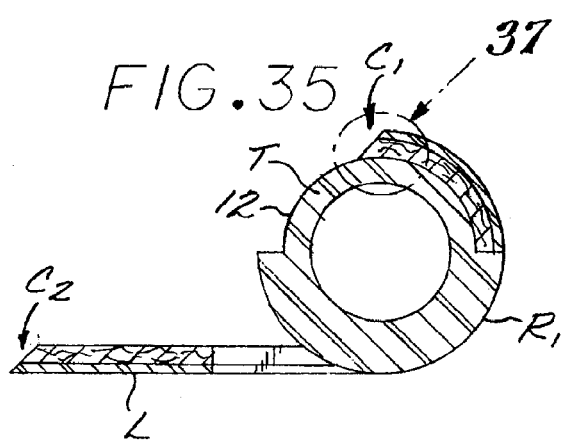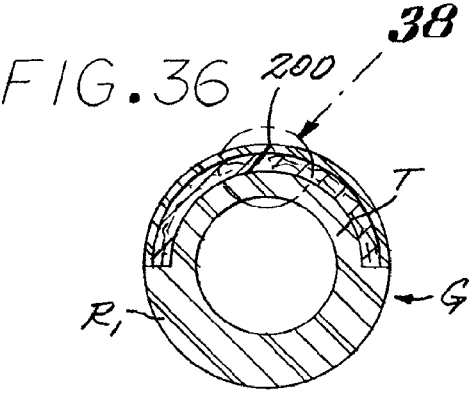

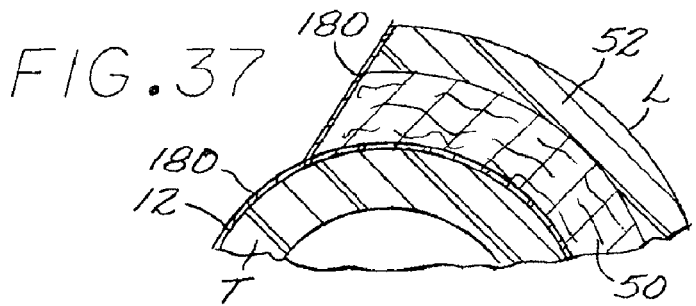
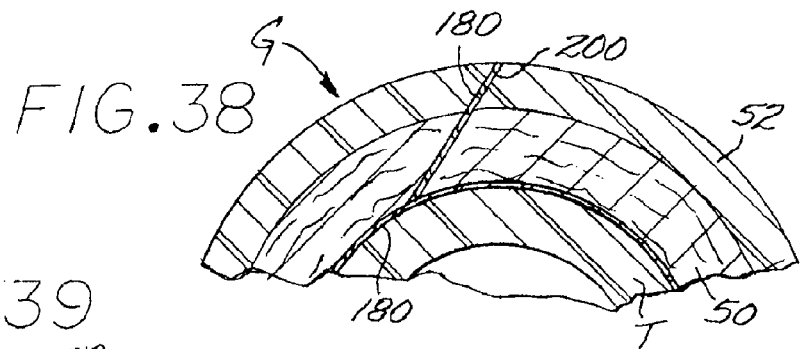
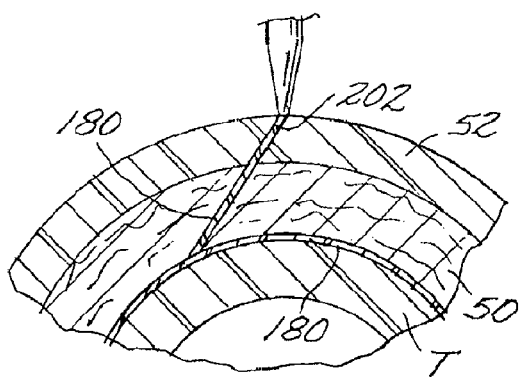
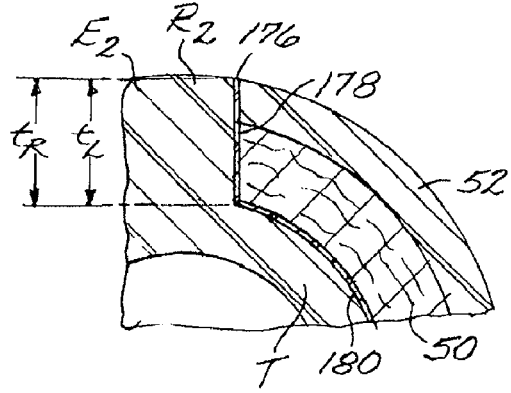
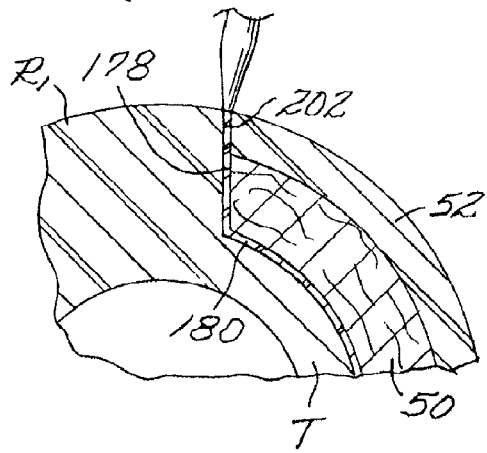
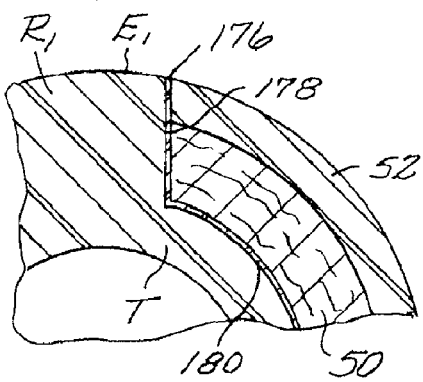

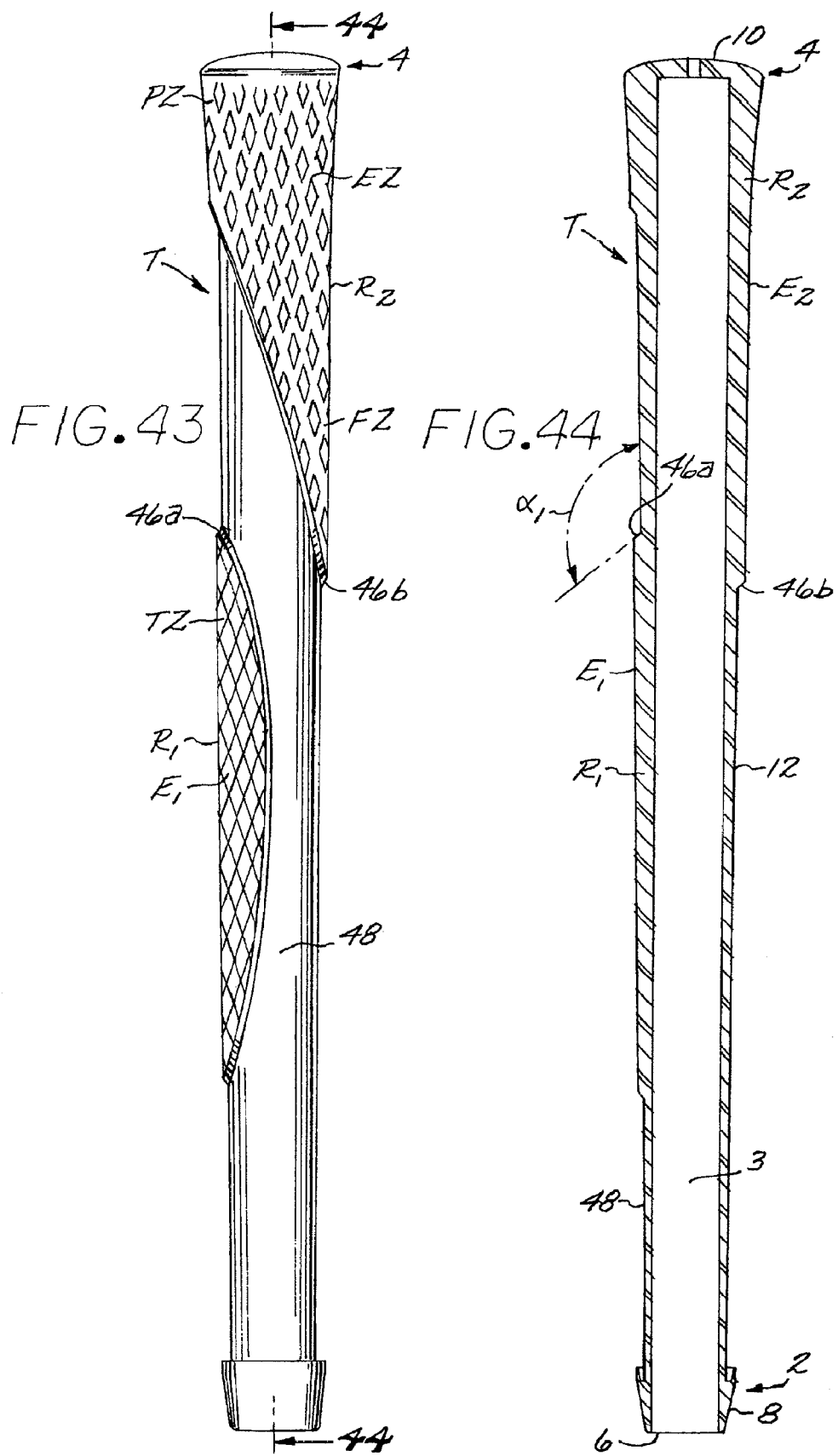

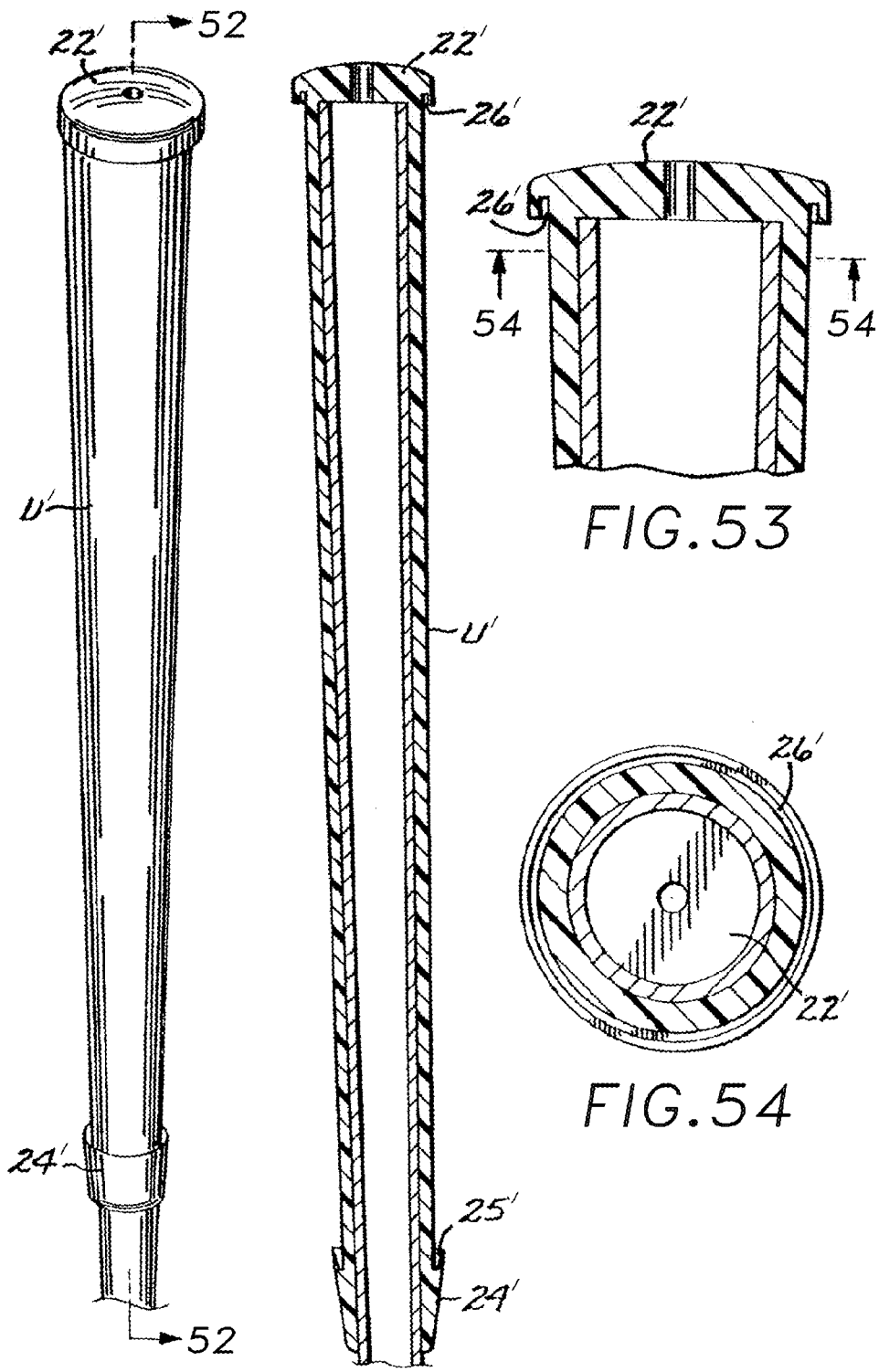

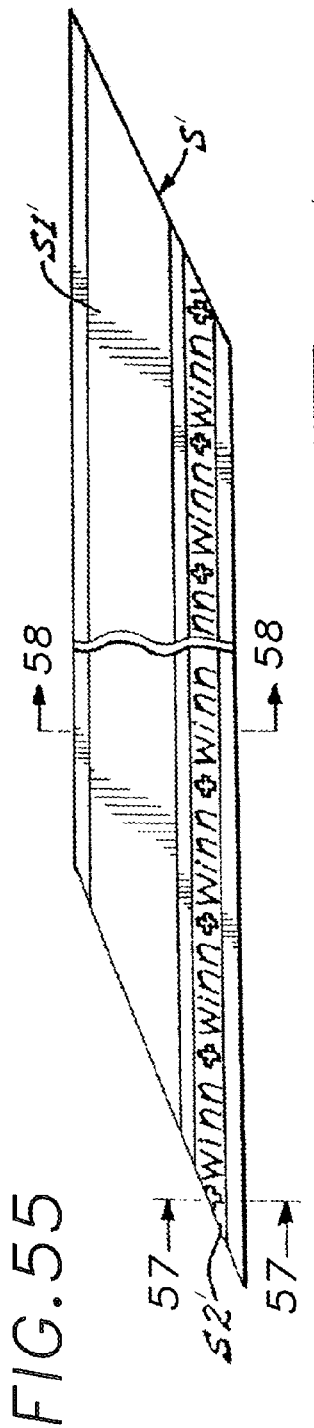
FIG.55
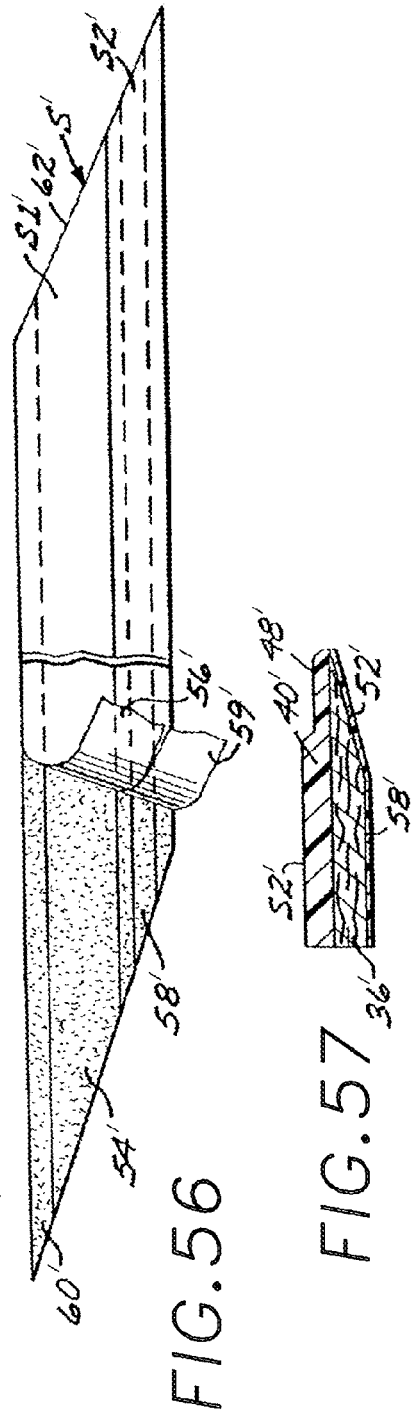
FIG.56
FIG.57
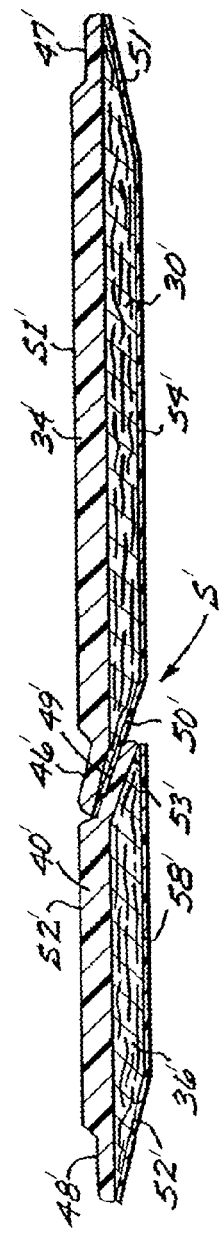
FIG.58

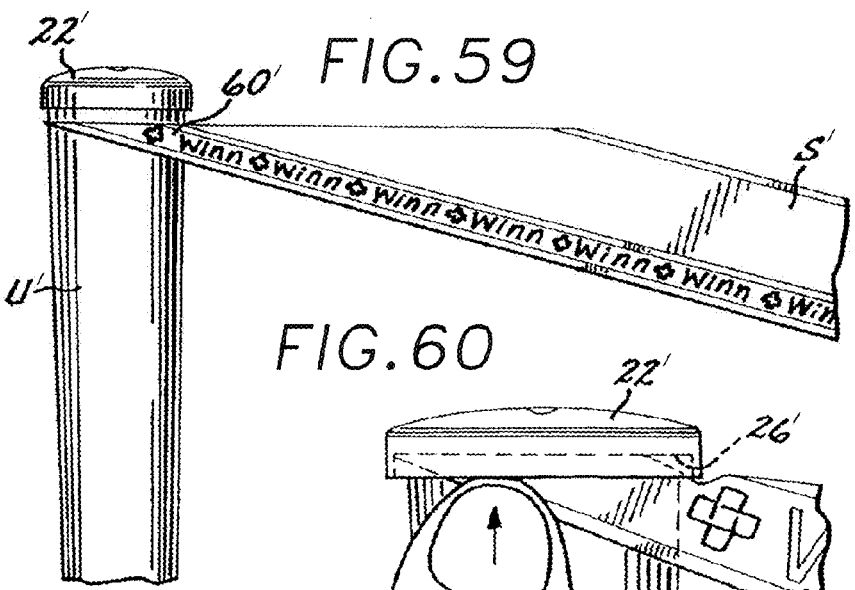
FIG. 59
FIG. 60
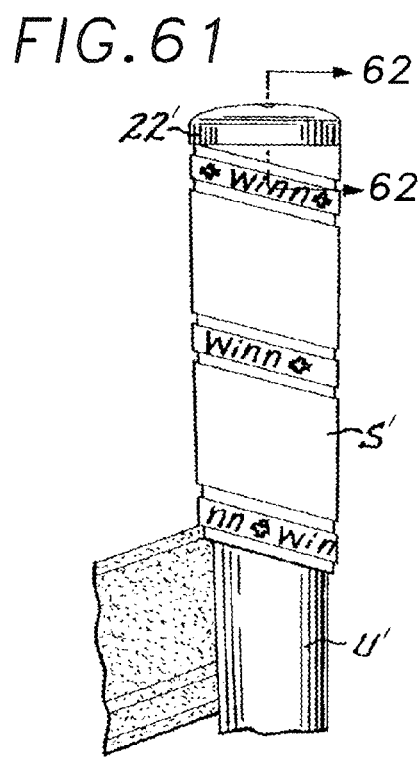
FIG. 61
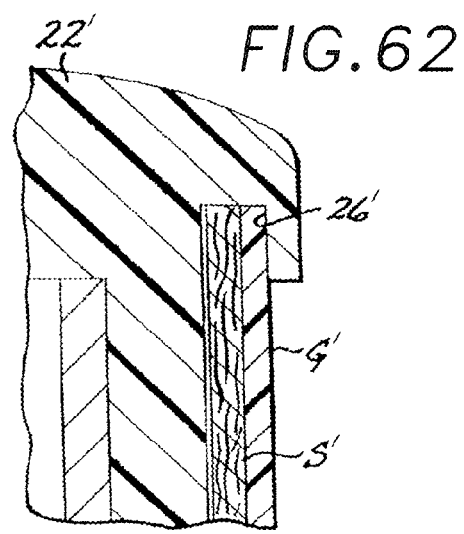
FIG. 62

GRIP

RELATED U.S. APPLICATION DATA

This application is a continuation-in-part of U.S. patent application Ser. No. 11/838,670, filed Aug. 14, 2007, pending.

This application is also a continuation-in-part of U.S. patent application Ser. No. 12/425,187, filed Apr. 16, 2009, pending, which is a continuation of U.S. patent application Ser. No. 11/412,196, filed Apr. 25, 2006, pending, which is a continuation of U.S. patent application Ser. No. 10/167,216, filed Jun. 11, 2002, now U.S. Pat. No. 7,137,904,

INCORPORATION BY REFERENCE

This application hereby incorporates by reference, in their entireties, U.S. Pat. Nos. 6,244,975, 6,627,027, 6,695,713, 6,843,732 and 6,857,971; U.S. Publication No. 2007/0004529; and U.S. patent application Ser. Nos. 11/438,808, filed May 22, 2006, 11/417,643, filed May 3, 2006, 11/417,696, filed May 3, 2006, 11/417,623, filed May 3, 2006, 11/689,452, filed Mar. 21, 2007, 11/412,196, filed Apr. 25, 2006, 10/167,216, filed Jun. 11, 2002, 12/425,187, filed Apr. 14, 2009, and 11/838,670, filed Aug. 14, 2007.

BACKGROUND OF THE INVENTION

1. Field of the Invention

This application relates to an improved grip, in particular an improved grip for use with golf clubs.

2. Description of the Related Art

Applicant has previously developed resilient grips which successfully reduce impact shock to the muscle and arm joints of a user and also provide a feeling of tackiness between a user's hands and the grip, improving upon prior art rubber grips. See, for example, U.S. Pat. No. 5,797,813 granted to Applicant on Aug. 25, 1998, U.S. Pat. No. 6,843,732 granted to Applicant on Jan. 18, 2005, and U.S. Pat. No. 6,857,971 granted to Applicant on Feb. 22, 2005.

Some of these earlier grips utilize a polyurethane-felt strip which is spirally wrapped around an underlisting sleeve that is slipped onto and adhered to a golf club shaft. The sides of the strips are formed with overlapping heat depressed recessed reinforcement edges. While such grips have proven satisfactory in reducing impact shock, the fabrication is labor intensive, particularly since the strip must be wrapped manually about the underlisting sleeve within specific pressure parameters. Additionally, it is difficult to accurately align the adjoining side edges of the strip as such strip is being spiraling wrapped about the underlisting sleeve. Further, these wrapped grips can become twisted during the wrapping process.

Applicant's U.S. Pat. No. 6,857,971 disclosed a single panel grip which in one embodiment provided the same tackiness and resistance to shock afforded by such grips.

Applicant's U.S. Pat. No. 6,843,732 disclosed multiple segments incorporated into a single panel, which is then applied to the underlisting sleeve.

Applicant's U.S. Patent Publication No. 2007-0004529 disclosed incorporating multiple two layer sheet pieces onto a backing layer.

The present invention relates to an improved grip assembly for golf clubs and other sporting equipment employing handles subject to shock when such devices are impacted.

It is well known that the shock generated by impact between a golf club and a golf ball can adversely affect muscle tissue and arm joints. The energy generated by such impact is usually of high frequency and short duration with rapid decay and which is often known as "impact shock." Tight grasping of a golf club grip to keep it from slipping in a user's hands contributes to such impact shock.

The Applicant has previously developed resilient grips which successfully reduce or even eliminate impact shock to the muscle and arm joint of the users of golf clubs. See for example U.S. Pat. No. 5,797,813, granted to applicant Aug. 25, 1998. Such earlier grips utilize a polyurethane layer bonded to a felt layer to define a resilient strip, which is spirally wrapped around an underlisting sleeve, with such underlisting sleeve being slipped over the handle portion of a golf club shaft.

A problem encountered with such grips is the tendency of the spirally-wrapped resilient strip to unravel from the golf club handle when a golf club is removed form and inserted into a golf bag. This problem has existed since at least 1923 as evidenced by Howe U.S. Pat. No. 1,528,190 wherein the inventor stated:

"After using a club, the golfer often throws his club violently into his bag; in doing so the handle end is of course within the bag.

When the club is thrown into the bag in this way, the end of the handle rubs along the inside of the bag and frequently results in stripping the end of the leather beyond the cord wrapping. Then the cord wrapping will become displaced or broken and it will be necessary to repair the handle."

My U.S. Pat. No. 6,386,989 discloses a golf club grip wherein the lower end of the resilient strip is restrained from unraveling from the underlisting sleeve by forming the upper portion of the nipple of the sleeve with a circumferential groove which receives the lowermost edge of the strip, after which an outer peripheral lip defined by the groove is folded upwardly over such lower edge. The lip snugly encompasses the strip's lower edge and retains the lower edge against unraveling from the sleeve and hence the handle of the golf club during play, as well as when a golf club is inserted into and removed from a golf bag.

Despite these improvements, there remains the opportunity for additional grip advances.

SUMMARY OF THE INVENTION

Embodiments of the present disclosure include a tube preferably for use with a golf club grip wherein the tube includes a body having a first end, a second end including a cover, a support surface positioned between the first and second ends and a raised portion. The raised portion extends outwards from the support surface and may be integrally formed with the support surface. The cover may define a substantially closed outer surface and extends outwards from the support surface. The raised portion includes an exposed surface and a connecting surface extending between the support surface and the exposed surface. The raised portion also extends along the body to form a finger zone on the body. There is no slot in the underside of the cover, leaving the support surface adjacent the cover exposed. In some embodiments, the raised portion is integrally formed with the cover such that the exposed support surface adjacent the cover is adjacent the connecting surface of the raised portion.

Embodiments of the present disclosure include a grip preferably for use with a golf club wherein the grip includes a tube having a body with a first end, a second end including a cover, a support surface positioned between the first and second ends and a raised portion extending outwards from the support surface. The raised portion may be integrally formed with the support surface and the cover may define a substantially closed outer surface and may extend outwards from the support surface. The raised portion includes an exposed surface and a connecting surface extending between the support surface and the exposed surface. The raised portion may also extend along the body to form a finger zone on the body. The grip further includes a layered sheet including an inner layer and an outer layer. The sheet is configured to overlay the support surface and not the exposed surface of the raised portion. The layered sheet is wrapped about the tube such that the layered sheet contacts the support surface of the tube and the inner layer of the layered sheet may be adhered to the support surface. The outer surface of the layered sheet and the exposed surface of the raised portion cooperate to define a gripping surface positioned to be gripped by, for example, a golfer. The outer surface of the layered sheet and at least a portion of the outer surface of the cover extend outwardly substantially the same distance. In some embodiments, the raised portion and the cover are integrally formed such that they cooperate to form the end of the grip and the end region of the gripping surface.

The golf club grip of the present invention solves the problem of the upper end of the resilient strip of a golf club grip unraveling from the handle of a golf club during play and particularly when the golf club is removed from and inserted into a golf bag. Such problem is solved by forming the underside of the cap of the underlisting sleeve with a circumferential slot that snugly receives the upper edge of the resilient strip to prevent the strip from unraveling.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

Further objects, features and advantages of the inventions will become apparent from the following detailed description taken in conjunction with the accompanying figures showing illustrative embodiments of the invention, in which:

FIG. 1 is a perspective view of a golf club incorporating a grip according to some embodiments;

FIG. 2 is a front view of a grip according to some embodiments;

FIG. 3 is a rear view of a tube according to some embodiments;

FIG. 4 is a side view of the tube shown in FIG. 3;

FIG. 5 is a front view of the tube shown in FIG. 3;

FIG. 6 is a horizontal sectional view taken along line 6-6 of FIG. 4;

FIG. 7 is a horizontal sectional view taken along line 7-7 of FIG. 5;

FIG. 8 is an enlarged view of the encircled area designated 8 in FIG. 6;

FIG. 12 is a horizontal cross-sectional view showing a mold which may be utilized in forming a layered sheet of a grip according to some embodiments;

FIG. 13 is an enlarged view of the encircled area designated 13 in FIG. 12;

FIG. 14 is an enlarged view of an exemplary pattern that may be formed by the mold shown in FIGS. 12 and 13;

FIG. 15 is an enlarged view of another exemplary pattern that may be formed by the mold shown in FIGS. 12 and 13;

FIG. 18 is a schematic view showing an apparatus for use in a portion of a method of making a sheet according to some embodiments;

FIG. 19 is an enlarged view of the encircled area designated 19 in FIG. 17;

FIG. 20 is an enlarged view of the encircled area designated 20 in FIG. 19;

FIG. 21A is a SEM image at 100 times magnification of a cross-section of a sheet made according to a method of some embodiments;

FIG. 23 is a partial schematic cross-sectional view taken along the line 23-23 in FIG. 19;

FIG. 24 is a partial schematic cross-sectional view of a painted sheet;

FIG. 25 is a front view of a layered sheet of a grip according to some embodiments;

FIG. 26 shows the bottom edge of a layered sheet being skived;

FIG. 29 is a rear view showing adhesive being applied to a layered sheet of a grip according to some embodiments;

FIG. 30 is a front view showing adhesive being applied to the exterior of a tube according to some embodiments;

FIG. 33 is a side elevational view showing a layered sheet after it has been adhered to a tube according to some embodiments;

FIG. 34 is a horizontal sectional view taken along line 34-34 of FIG. 31;

FIG. 35 is a horizontal sectional view taken along line 35-35 of FIG. 32;

FIG. 36 is a horizontal sectional view taken along line 36-36 of FIG. 33;

FIG. 37 is an enlarged view of the encircled area designated 37 in FIG. 35;

FIG. 38 is an enlarged view of the encircled area designated 38 in FIG. 36;

FIG. 39 illustrates the use of a nozzle in connection with the enlarged view shown in FIG. 38;

FIG. 40 is a partial cross-sectional view taken along the line 40-40 in FIG. 33;

FIG. 41 is a partial cross-sectional view taken along the line 41-41 in FIG. 2;

FIG. 42 illustrates the use of a nozzle in connection with the enlarged view shown in FIG. 41;

FIG. 43 is a side view of a tube according to some embodiments;

FIG. 44 is a horizontal sectional view taken along line 44-44 of FIG. 43;

FIG. 51 is a side view of an underlisting sleeve utilized in a spiral-wrap golf club grip embodying the present invention;

FIG. 52 is a vertical sectional view taken in enlarged scale along line 52-52 of FIG. 51;

FIG. 53 is a cross-sectional view showing the upper portion of the underlisting sleeve of FIG. 52;

FIG. 54 is a horizontal view taken along line 54-54 of FIG. 53;

FIG. 55 is a broken top view of a resilient strip of a grip embodying the present invention;

FIG. 56 is a bottom view showing the underside of the grip of FIG. 55;

FIG. 57 is a vertical sectional view taken in enlarged scale along line 57-57 of FIG. 55;

FIG. 58 is a vertical sectional view taken in enlarged scale along line 58-58 of FIG. 55;

FIG. 59 is a broken side elevational view showing the strip of FIGS. 55-57 about to be spirally-wrapped about the underlisting sleeve of FIGS. 51-54;

FIG. 60 is a broken side elevational view taken in enlarged scale showing the leading edge of the resilient strip being manually forced into an upwardly extending circumferential slot formed in the underside of the cap of said underlisting sleeve;

FIG. 61 is broken side elevational view showing the resilient strip being spirally-wrapped about the underlisting sleeve;

FIG. 62 is a broken vertical sectional view taken in enlarged scale along line 62-62 of FIG. 61;

Figure 9:
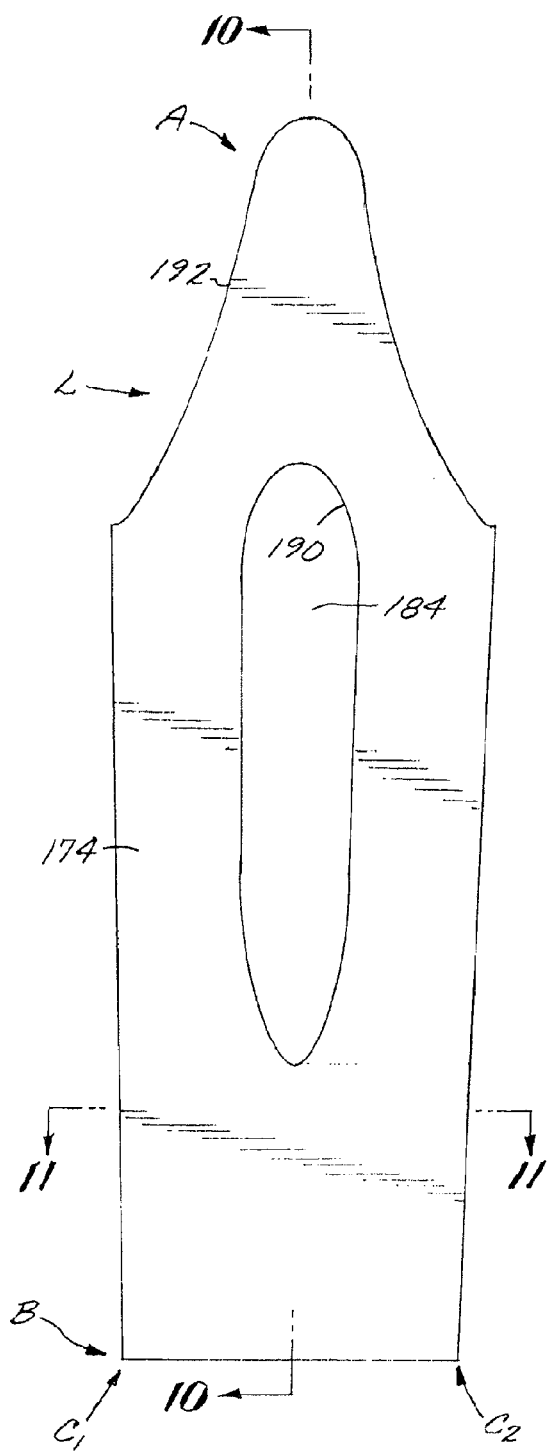
FIG. 9 is a front view of an embodiment of a layered sheet according to some embodiments.
Figure 10:
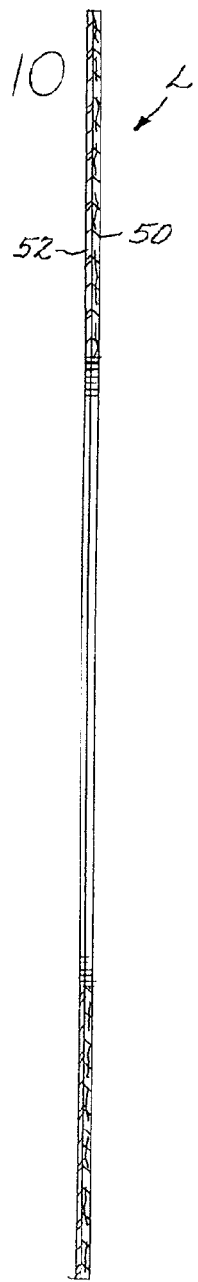
FIG. 10 is a vertical cross-sectional view taken along the line designated 10-10 in FIG. 9.
Figure 11:
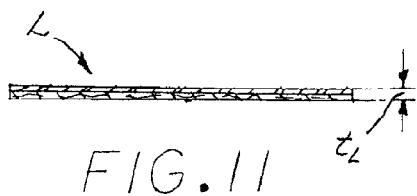
FIG. 11 is a horizontal cross-sectional view taken along the line designated 11-11 in FIG. 9.
Figure 16:
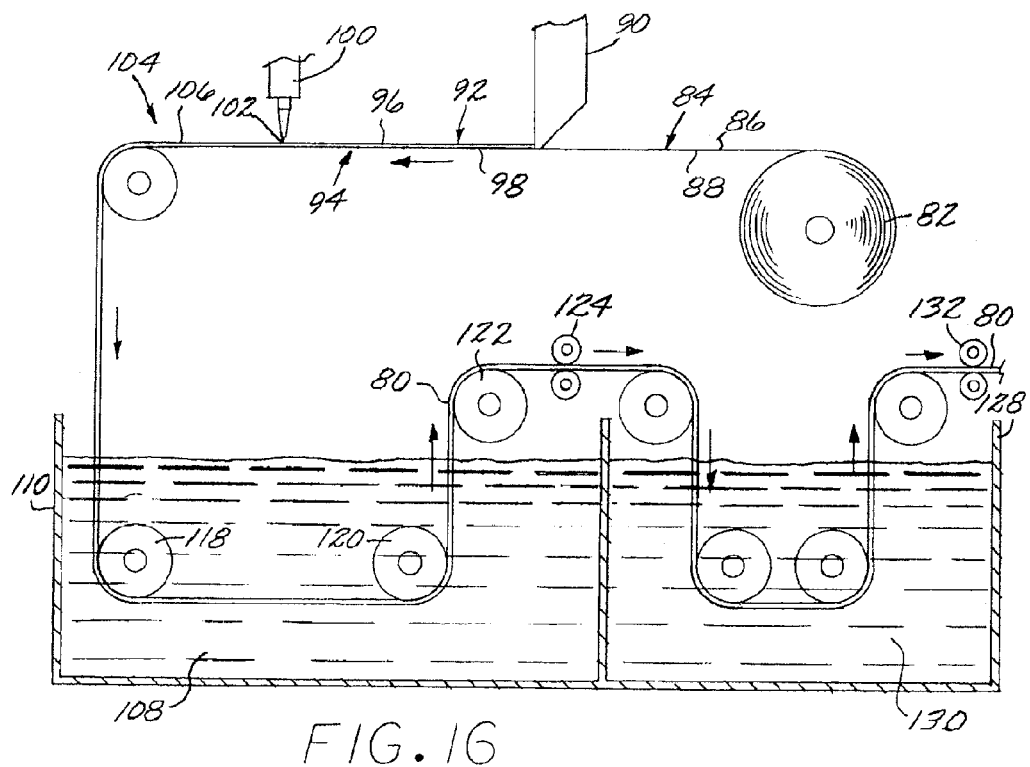
FIG. 16 is a schematic view showing a portion of a method of making a sheet according to some embodiments.
Figure 17:
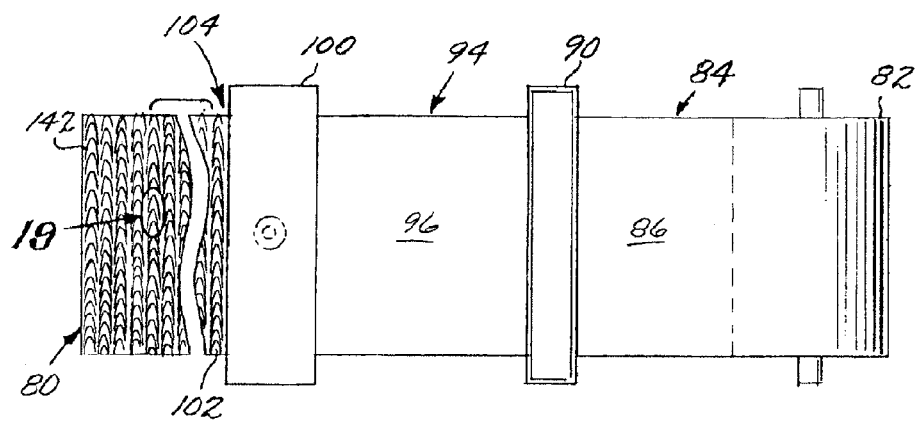
FIG. 17 is a top view of a portion of the schematic view shown in FIG. 16.

While the subject inventions will now be described in detail with reference to the figures, it is done so in connection with the illustrative embodiments. It is intended that changes and modifications can be made to the described embodiments without departing from the true scope and spirit of the subject inventions.

DETAILED DESCRIPTION

There are numerous embodiments disclosed herein. As one of skill in the art will appreciate, when the specification refers to various features in the context of the "present invention", it refers to features present in some embodiments of the invention rather than in all iterations of the invention.

FIG. 1 shows one embodiment of a grip G attached to the shaft S of a golf club GC. FIG. 2 shows the grip G in greater detail.

Certain embodiments of grip G include a resilient mounting tube T and a layered member or sheet L wrapped about the tube T. The mounting tube T includes raised portions R which define one or more exposed surfaces E. Desirably tube T includes a tubular body 48 with one or more raised portions $R_1, R_2 \ldots R_n$ having associated exposed surfaces $E_1, E_2 \ldots E_n$. In the illustrated embodiment, tube T includes two raised portions $R_1$ and $R_2$ with exposed surfaces $E_1$ and $E_2$. The grip defines a gripping surface GS. The gripping surface GS may include an outer surface of a layered sheet L and exposed surfaces $E_1$ and $E_2$ of raised portions $R_1$ and $R_2$ of tube T. (See, e.g., FIG. 2).

More particularly, referring to FIGS. 3 through 8, there is shown one embodiment of the resilient tube T. During the manufacture of a grip G, tube T may be mounted on a mandrel (not shown) as known to those of skill in the art. Tube T includes a first end 2 and a second end 4. Tube T further includes a hollow inner cavity 3 configured to correspond to the outer shape of the shaft GS of a golf club GC. An opening 6 and a ring 8 are formed at the first end 2 while the second end 4 of tube T is formed with a cover 10, which in some embodiments substantially closes the second end 4. Tube T has a support surface 12 extending generally between cover 10 and ring 8. In some embodiments, tube T is formed of a resilient material such as a natural or synthetic rubber or plastic. For example, the rubber might include a mixture of synthetic rubber, for example EPDM (Ethylene Propylene Diene Monomer) and natural rubber. Other examples include TPE (Thermoplastic Elastomer), TPR (Thermoplastic Rubber), TPU (Thermoplastic Polyurethane), and TPV (Thermoplastic Vulcanizate). In some embodiments, the ratio of synthetic rubber to natural rubber is approximately 2 to 3.

As known to those of skill in the art, tube T may be formed in a mold (not shown). In some embodiments, raised portions $R_1$ and $R_2$ are integrally formed on tubular body 48. In such instances, tubular body 48 and raised portions $R_1$ and $R_2$ may comprise the same material. If this is the case, forming raised portions $R_1$ and $R_2$ merely requires creating the inverse of raised portions $R_1$ and $R_2$ in the mold. In such cases, the material is selected to enhance the properties desired for raised portions $R_1$ and $R_2$ while balancing the desired properties for tubular body 48. In some instances, it may be desired to control the durometer, tackiness, resistance to torque, durability, color, or other property of raised portions $R_1$ and $R_2$ to enhance certain properties of completed grip G.

As shown in FIG. 7, a connecting surface 46a forms an angle $\alpha_1$ with a line tangent to the intersection of connecting surface 46a of raised portion $R_1$ and support surface 12 of tube T. In general, connecting surface 46 desirably extends between support surface 12 and exposed surface E of raised portion R and forms an angle $\alpha$. In some embodiments, angle $\alpha$ is in the range of approximately 5 and 175 degrees. In some embodiments, angle $\alpha$ is in the range of approximately 5 and 90 degrees. In some embodiments, angle $\alpha$ is in the range of approximately 90 and 175 degrees. In some embodiments, for example the embodiment shown in FIG. 7, angle $\alpha$ is approximately 90 degrees.

In general, raised portion R extends a width w around the circumference of body 48 of tube T. Width w may be constant along tube T, for example if raised portion R forms a rectangular shape. Alternatively, width w may vary along tube T. In some embodiments, width w may extend to a maximum distance around the circumference of tube T (expressed as a percentage of the circumference of the body 48 of tube T) in the range of approximately 25% to 75%. In some embodiments, width w may extend to a maximum in the range of approximately 5% to 25%. In some embodiments, width w may extend to a maximum in the range of approximately 75% to 100%. In some embodiments, width w may vary along the longitudinal length of R. For example, in the illustrated embodiment, raised portion $R_1$ defines an elliptical shape with a width $w_1$ starting near zero and widening to approximately 50% and narrowing back to near zero along tube T from first end 2 to second end 4. Width w need not vary consistently along tube T. Referring to FIGS. 3 through 5, in the illustrated embodiment raised portion $R_1$ is configured to form a thumb zone TZ in the gripping surface GS. Thumb zone TZ is shown on the front of tube T to accommodate a user's thumbs when that user employs a traditional golf grip with some or all of the fingers overlapping and/or interlocking on the back of the grip and the thumbs resting on or near the front of the grip. As will be understood by one of skill in the art, thumb zone TZ may be placed in other areas of gripping surface GS to accommodate different grips.

In some embodiments raised portion $R_1$ extends at least the length of an adult's finger pad in a circumferential direction. In some embodiments, raised portion $R_1$ extends at least the length of an adult's finger pad along the longitudinal direction. In some embodiments, raised portion $R_1$ extends at least the length of two adult finger pads along the longitudinal direction. For purposes of this application, the length of an adult's finger pad is defined as being one inch.

In some embodiments, the upper portion of raised portion $R_2$ adjacent cover 10 extends a width $w_2$ of 100% of the circumference of tube T. In some such embodiments, raised portion $R_2$ is formed integrally with cover 10 such that the transition between cover 10 and raised portion $R_2$ is substantially smooth. As shown in, for example, FIGS. 3 through 5, raised portion $R_2$ may extend further down the length of tube T from second end 4 toward first end 2 on the back of tube T than it does on the front of tube T. As described in greater detail below, such an extended region can provide a finger zone FZ in the gripping surface GS with characteristics different than those provided by the layered sheet L in other regions of the gripping surface GS. In some embodiments, finger zone FZ of raised portion $R_2$ extends at least the width of 4 adult finger pads along tube T from second end 4 toward first end 2. For purposes of this application, the width of an adult finger pad is defined as being one half inch.

In some embodiments, the upper portion of raised portion $R_2$ in the front of tube T is configured to form a palm zone PZ in gripping surface GS. In some embodiments, palm zone PZ of raised portion $R_2$ extends at least the width of one adult finger pad along tube T from second end 4 toward first end 2. In some embodiments, palm zone PZ extends at least the width of 2 or more adult finger pads along tube T from second end 4 toward first end 2.

Friction may be enhanced on raised portion R by forming ridges or valleys in various patterns 47 on surface E of raised portion R. As shown in, for example, FIG. 5, different patterns 47a and 47b may be used. The patterns may be different on different raised portions or the same or similar patterns may be used. In some embodiments, the patterns are formed as raised portion R is molded. In other embodiments, the patterns are applied by altering surface E of portion R after the molding process, such as by grinding surface E.

In some embodiments, one or more of the raised portions R may be formed separately from tubular body 48 and attached to tubular body 48 through bonding, adhesive or other mechanisms known to those of skill in the art to form tube T. Separately forming a portion R may facilitate using a different material to form the particular raised portion R than is used to form tubular body 48. In embodiments where multiple raised portions are desired, separately forming one or more of the portions allows for a wide variety of different materials to be incorporated into the grip. It is also possible for some portions to be formed integrally with tubular body 48 while others are attached after tube T is molded. Raised portion R is generally configured with a thickness $t_R$ as shown in FIG. 7.

Referring to FIG. 8, ring 8 of tube T may be formed with an upwardly extending slot 30 defined by a portion 32 of support surface 12 of tube T and lip 34 extending upwardly from ring 8 and preferably wrapping substantially circumferentially around tube T. Lip 34 defines an inner surface 36 facing tube T, an upper surface 38 facing upward from ring 8, and an outer surface 40 facing away from support surface 12 of tube T. Upwardly extending lip 34 extends over portion 32 of support surface 12 of tube T. The lower-most portion of slot 30 is defined by an inner, lower, upwardly facing surface 42. Though lip 34 may flex outward from tube T, in many embodiments it resists remaining in a fully flexed position in which it lays flat, thereby fully exposing tube T support surface 12. In alternative embodiments, outer surface 40 tapers toward inner surface 36, or inner surface 36 tapers toward outer surface 40 such that upper surface 38 is comparatively narrow and in some embodiments is an annular point extending substantially circumferentially around tube T. Slot 30 receives, for example, the bottom region of a layered sheet L. To assist in installation of a layered sheet L, in some embodiments tube T will be formed with centering notches (not shown) disposed on an outer surface of cover 10, ring 8 and/or both.

Referring now to FIGS. 9 through 15 a layered sheet L for use with tube T is described. Various aspects and attributes of layered sheet L may be combined from the disclosure below. Generally, layered sheet L has a thickness $t_L$ (FIG. 11) and includes an outer surface 174 and an inner layer 50 having its outer face bonded to the inner face of an outer layer 52. Outer layer 52, in some embodiments, comprises a polymer. In some embodiments, that polymer comprises polyurethane. Additional materials such as waterproofing coatings may be incorporated on outer surface 174. Similarly, other materials such as fabric meshes may be incorporated into outer layer 52. Inner layer 50 may be fabricated of a fibrous material including, for example, wool, polyester, nylon, or mixtures thereof. In certain embodiments, a nylon polyester fibrous material such as felt is used. During the manufacturing process, some of outer layer 52 may permeate inner layer 50. For example, when polyurethane is used in the outer layer and a fibrous material is used in the inner layer, some polyurethane may permeate the fibrous layer. In another embodiment, inner layer 50 may comprise a polymer, such as, for example, ethylene vinyl acetate (EVA).

Outer layer 52 may provide a cushioned grasp for a golfer's hands on a golf club and may enhance the golfer's grip by providing increased tackiness between the golfer's hands and the grip. Inner layer 50 may provide strength to outer layer 52 and serve as a means for attaching the bonded-together layered sheet L to the tube T.

The outer surface of inner layer 50 in some embodiments is bonded to the inner surface of outer layer 52. For purposes of this disclosure, the definition of bonding is intended to have a broad meaning, including commonly understood definitions of bonding, adhering, fixing, attaching, sewing, coupling, and gluing. As will be appreciated by those of skill in the art, the foregoing terms have their ordinary meaning. In some embodiments, the material used in the outer layer may penetrate some distance into the inner layer. When polyurethane is used in outer layer 52, such polyurethane is preferably coagulated to define pores, as shown, for example, in FIG. 21A. The polyurethane may be coagulated and bonded directly to inner layer 50 or may be first coagulated on an intermediary layer (not shown) and later attached to inner layer 50.

Layered sheet L may include centering notches (not shown) positioned at the top region A and/or the bottom region B of the layered sheet indicating a middle point between a first side region $C_1$ and a second side region $C_2$. Centering notches may assist in the application of layered sheet L to tube T to form grip G. Layered sheet L is configured to correspond with tube T and, in particular, has been adapted to correspond with raised portions $R_1$ and $R_2$. Layered sheet L includes cut-out 184. Cut-out 184 is substantially elliptical in shape defined by edge 190 and has its major axis substantially parallel to the longitudinal axis of tube T. As such, cut-out 184 corresponds to the overall shape of raised portion $R_1$. Top region A is defined by edge 192 shaped to correspond to the lower edge of raised portion $R_2$.

Referring now to FIGS. 12 through 15, there is shown a mold M which is utilized to form a friction enhancing pattern 54 as known to those of skill in the art. Friction enhancing pattern 54 may take any of a number of forms or combinations thereof. For example, two such patterns 54a and 54b are shown in FIGS. 14 and 15, respectively. In alternative embodiments, mold M forms logos, designs, insignias and other marks (not shown) in outer layer 52. Mold M in one embodiment includes a heated platen 56 formed with a cavity 58. Platen 56 is provided with depending protrusions 60 that engage outer surface 174 of layered sheet L so as to form depressed friction enhancing pattern 54, as seen in FIG. 13. Friction enhancing pattern 54 may also be applied to the other layered sheets described below.

In alternative embodiments, other patterns may be formed on or in outer layer 52. These patterns may also incorporate stamped visual indicia, including designs or logos, on layered sheet L. In some embodiments, stamped visual indicia is ink stamped onto outer layer 52 using a suitable ink known to those of skill in the art. The ink in some implementations is waterproof, heat resistant and formulate d to resist degradation when coming into contact with a lubrication fluid or solvent which may be used to apply completed grip G over the end of golf club shaft CS (FIG. 1). It is to be understood that many other patterns and stamps may be used with other embodiments of the grip disclosed herein.

Though not shown in the figures, a multi-segment single panel as disclosed in U.S. Pat. No. 6,843,732, incorporated herein in its entirety, may also be applied to tube T as described herein. In some embodiments, raised portion R on tube T facilitates attachment of the multi-segment single panel disclosed in the '732 patent to tube T without first skiving some or all of the outer regions of the panel. Similarly, a layered sheet including cutouts and corresponding layered inserts as disclosed in U.S. patent application Ser. No. 11/417,643, incorporated herein in its entirety, may also be applied to tube T as described herein.

Referring to FIGS. 16 through 25, there is shown a method of forming a sheet 80 having an inner layer and an outer layer that can be shaped into another layered sheet L2 (FIG. 25). Referring to the upper right-hand portion of FIG. 16, there is shown a supply roll 82 of substrate 84. Substrate 84 has a top surface 86 and a bottom surface 88. In some embodiments, substrate 84 includes a fibrous material, for example felt or other fabrics, which may include wool, polyester, nylon, or mixtures thereof. In one embodiment, substrate 84 comprises a fabric including nylon and polyester. From the supply roll 82, substrate 84 is moved horizontally to the left below a first polyurethane dispensing machine 90. The first dispensing machine 90 preferably continually deposits a first region of liquid polyurethane 92, for example polyester or polyether dissolved in dimethyl formahide (DMF), onto top surface 86 of substrate 84 to form first web 94. The first dispensing machine 90 preferably uses a nozzle, sprayer or the like to deposit the first polyurethane region 92 and preferably uses a blade to control the thickness of the first polyurethane region 92. First polyurethane region 92 has a top surface 96 and a bottom surface 98.

As first web 94 continues to the left from first dispensing machine 90, a second polyurethane dispensing machine 100 deposits a second liquid polyurethane region 102 onto at least a portion of top surface 96 of first polyurethane region 92 to form a second web 104. Second polyurethane region 102 has a top surface 106. Second web 104 is then moved into a water bath 108 contained in a first tank 110. As second web 104 is immersed in water bath 108, polyurethanes 92 and 102 will coagulate so as to form a coagulated region 112 on substrate 84. Coagulated region 112 and substrate 84 cooperate to form sheet 80 wherein the coagulated region forms the outer layer and the substrate forms the inner layer. Coagulated region 112 has a top surface 144 and a bottom surface 114.

As is known, the coagulation time of the polyurethane will be determined by the desired thickness of coagulated region 112, with a thin region requiring less time to coagulate than a thick region. In some embodiments, the coagulation process bonds bottom surface 114 of coagulated region 112 to top surface 86 of substrate 84 so as to fix coagulated region 112 to substrate 84. This bond interface 116 is shown in FIG. 21A. A pair of rollers 118 and 120 are positioned within tank 110 to carry sheet 80 horizontally and then upwardly out of water bath 108 over roller 122. Sheet 80 is then moved horizontally to the right between a pair of squeezing rollers 124. These squeezing rollers 124 compress sheet 80 so as to force a major portion of the DMF disposed within pores 126 downwardly through substrate 84. Referring to FIG. 21A, the bottom end of a sufficient number of the pores are in contact with top surface 86 of substrate 84 to permit fluid flow from the pores through substrate 84. Referring again to FIG. 16, sheet 80 is then moved downwardly through one or more cleaning water bath tanks 128 (only one of which is shown), wherein the temperature of the water is sufficiently high to displace more DMF from the pores, with such DMF being replaced by water 130 contained in tank 128. From tank 128, sheet 80 passes through another pair of squeezing rollers 132 to squeeze more of the DMF out of the pores to be replaced with water 130. In practice, it may be necessary to utilize four or five cleaning baths to remove a desired amount of DMF from the pores. From the last water bath, sheet 80 is passed through a heating chamber (not shown) which drives out any water remaining within pores 126 so that such water is replaced by air.

In another embodiment (not shown), substrate 84 includes a flexible temporary support for the polyurethane during the wet coagulation process described above. Such a temporary support would be configured to be removed from bottom surface 114 of coagulated polyurethane region 112 after sheet 80 is formed. In such an embodiment, bond interface 116 is desirably relatively weak to facilitate separation of coagulated region 112 from substrate 84. One temporary support includes a smooth, flexible nylon cloth and is available from the Ho Ya Electric Bond Factory, Xin Xing Ind. Area. Xin Feng W. Rd., Shi Jie Town Dong Guan City, Guan Dong Province, China. Other materials include fluid-permeable textiles such as cotton or a synthetic cloth such as polyester. Generally, the temporary support would have the fluid-passing characteristics and smooth top surface of nylon cloth allowing the DMF and water to be squeezed out of the polyurethane pores and allowing the coagulated polyurethane to be readily stripped off such temporary support. Removing substrate 84 from coagulated polyurethane region 112 provides for use of coagulated polyurethane region 112 alone or provides the opportunity to use an alternative substrate. For example, it is possible to replace the fabric substrate with a polymer substrate such as ethylene-vinyl acetate (EVA). The EVA substrate may include an adhesive coating to bond the EVA substrate to coagulated polyurethane region 112. EVA having an adhesive coating covered by a protective paper is sold by the aforementioned Ho Ya Electric Bond Factory.

Referring now to FIG. 18, a schematic illustration of second dispensing machine 100 is shown. In FIG. 18, dispensing machine 100 includes a first housing 134 having a first dispensing nozzle 136. Housing 134 is connected to perpendicular rail 138 extending along the Y axis as illustrated. Rail 138, in turn, is connected to parallel rails 140 extending along the X axis as illustrated. Dispensing machine 100 is configured to allow first web 94 of substrate 84 and first polyurethane region 92 to pass beneath nozzle 136, preferably at a constant pace, along the X axis (see FIGS. 16 and 17). First polyurethane region 92 may provide a base region for the second polyurethane region 102. In some regions, second polyurethane region 102 may extend completely through first polyurethane region 92 to be in contact with substrate 84. Dispensing machine 100 is preferably further configured to move nozzle 136 in one or both of the X and Y directions. In addition, nozzle 136 may be configured to start and stop depositing second polyurethane 102 as desired. The movement of nozzle 136 in the X and Y directions and the start/stop feature of the nozzle 136 provides for the ability to create a unique appearance which may include random or semi-random patterns 142 in second web 104 and, in turn, in sheet 80 (see FIG. 17). In other embodiments, web 94 is moved beneath a stationary nozzle 136 to create a pattern. For example, nozzle 136 could be fixed along the X axis and the pace with which web 94 is moved under nozzle 136 can be varied. Similarly, nozzle 136 could be fixed along the Y axis and web 94 can be shifted along the Y axis instead. Alternatively, nozzle 136 can be moved in both directions.

In other embodiments (not shown), dispensing machine 100 may include two, three or more nozzles for dispensing third, forth, etc. polyurethane regions. Such additional nozzles may be included in the same housing, separate housings or a combination thereof. It is also possible to include additional dispensing machines on separate rails to introduce still further variation in the application of the polyurethane regions.

Referring now to FIG. 19, there is shown an enlarged view of pattern 142 formed in coagulated polyurethane region 112 of sheet 80. Generally, top surface 144 of coagulated region 112 includes pattern 142 because first polyurethane 92 and second polyurethane 102 each include at least one contrasting characteristic. In the illustrated embodiment, the contrasting characteristic is color. However, other contrasting characteristics, or combinations thereof, could be incorporated to create the pattern such as contrasting durometers or levels of tackiness. In the figures, first polyurethane 92 defines a first color 146 and second polyurethane 102 defines a second color 148. As shown in greater detail in FIG. 20, pattern 142 on top surface 144 of coagulated region 112 includes a first region 150 and a second region 152 defined by first color 146 of first polyurethane 92 and second color 148 of second polyurethane 102, respectively.

As described above, the two polyurethanes 92 and 102 are coagulated onto substrate 84 in first water bath 108. The application of second polyurethane 102 onto a portion of top surface 96 of first polyurethane 92 prior to coagulation allows for the polyurethanes to mix and integrate below top surface 96 of the first polyurethane region such that coagulation of the polyurethanes forms the single coagulated region 112 (see FIGS. 21A and 21B). Despite the mixing of the two polyurethanes prior to coagulation, and the integration of the two polyurethanes during coagulation, each of the polyurethanes substantially maintains its original characteristics. The contrast in one or more characteristics of the polyurethanes creates pattern 142. Though the characteristics remain substantially distinct, there may be some blending along the interface of the two polyurethanes.

In the illustrated embodiment, top surface 96 of first polyurethane region 92 cooperates with top surface 106 of second polyurethane region 102 to form substantially smooth top surface 144 of coagulated region 112. Contrasting colors 146 and 148 on surface 144 cooperate to create pattern 142. If the first polyurethane is red and the second polyurethane is white, the process discussed above would result in a coagulated polyurethane region with distinct red and white regions, rather than a single blended pink region. Though the contrasting characteristics of first 92 and second 102 polyurethanes remain substantially distinct, the polyurethane structure below top surface 144 is preferably seamless between the different polyurethanes with a preferably continuous pore structure throughout (see FIGS. 21A and 21B).

FIG. 21A is a 100 times magnification of a cross-section of a sample coagulated sheet 80 taken along the line 21-21 in FIG. 20. FIG. 21A shows substrate 84, in the sample a polyester nylon fabric, with its top surface 86 bonded to bottom surface 114 of coagulated polyurethane region 112 along bond interface 116. Top surface 144 is generally smooth. The structure is desirably substantially seamless on both the top surface 144 between first region 150 and second region 152 and substantially seamless inside coagulated region 112 where first polyurethane 92 interfaces with second polyurethane 102. It is apparent that the structure is not just seamless and not just coagulated, but the two polymers polymerize with each other to form coagulated region 112. Accordingly, in the illustrated embodiment coagulated region 112 is a polymerized region. Coagulated region 112 preferably includes a plurality of generally vertically extending pores 126, top surface 144, and bottom surface 114. Pores 126 generally form substantially throughout coagulated region 112 including in the regions where first polyurethane 92 interfaces with second polyurethane 102 between top 144 and bottom 114 surfaces. Though polyurethane is preferred to form the coagulated region, other liquid polymers having contrasting characteristics may be used. Generally, the polymers will be combined while in their liquid states and allowed to polymerize together. As the polymers polymerize together, the structure of polymerized region 112 will preferably be seamless while maintaining the contrasting characteristics at least on outer surface 144 of polymerized region 112.

Figure 21B:
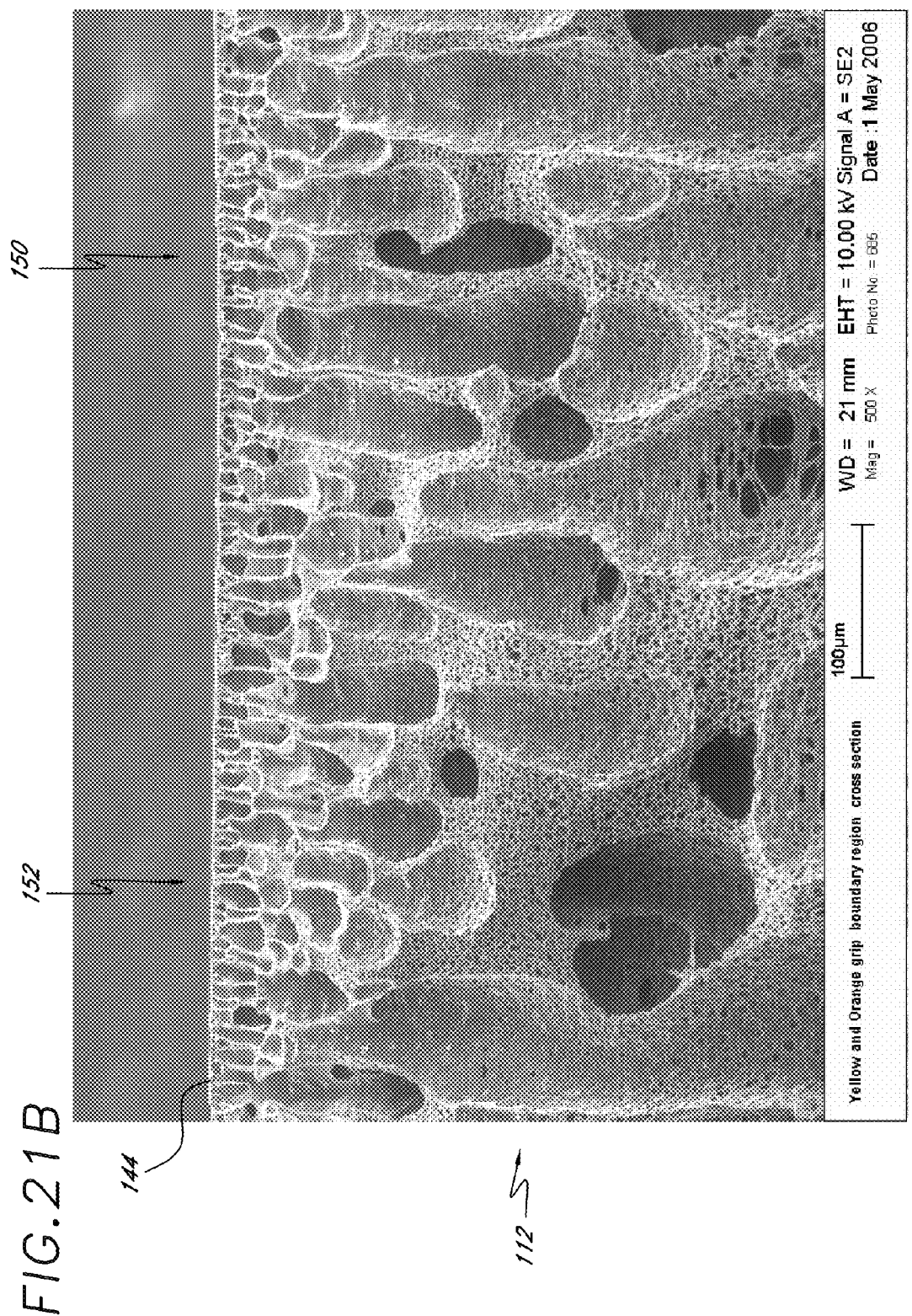
FIG. 21B is a SEM image at 500 times magnification of a portion of the cross-section shown in FIG. 21A.

FIG. 21B is a 500 times magnification of a portion of the cross-section shown in FIG. 21A. As is apparent from the figures, first 92 and second 102 polyurethanes are coagulated together to form coagulated region 112 with a substantially seamless structure between first color region 150 and second color region 152 and between the polyurethanes inside coagulated region 112.

Figure 22A:
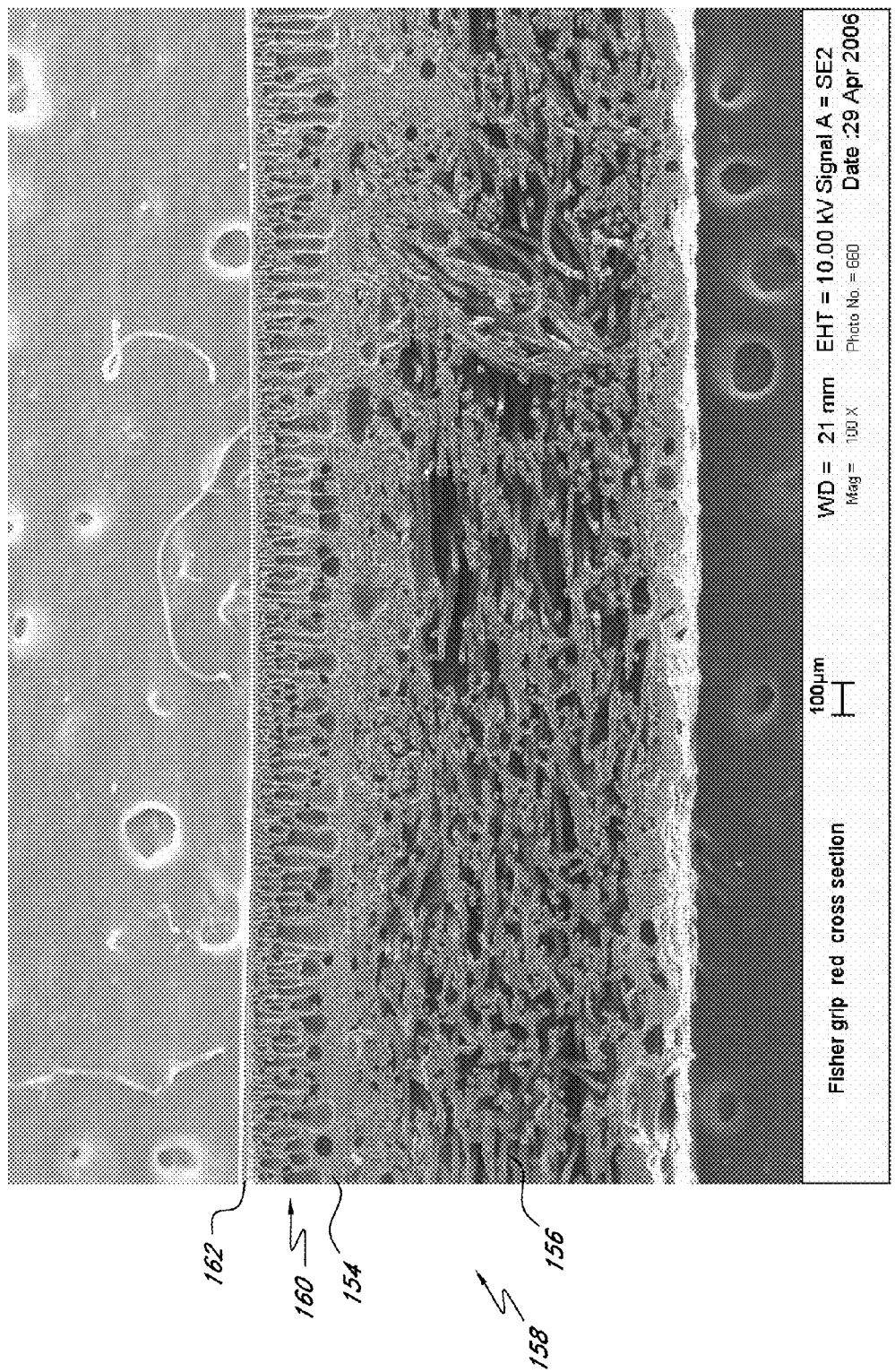
FIG. 22A is a SEM image at 100 times magnification of a cross-section of a sheet made according to a method of the prior art.
Figure 22B:
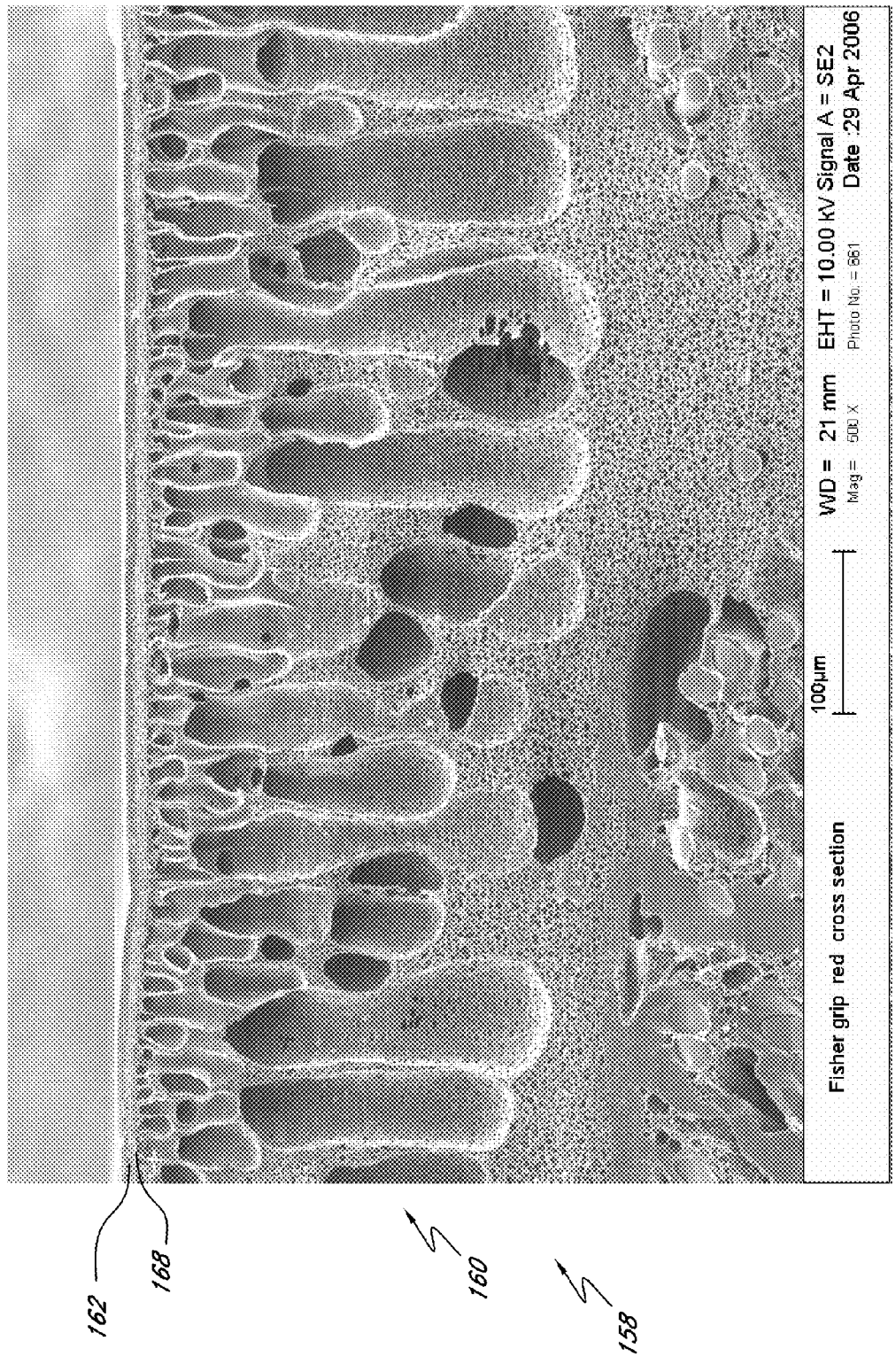
FIG. 22B is a SEM image at 500 times magnification of a portion of the cross-section shown in FIG. 21A.

FIGS. 21A and 21B may be contrasted with a prior art method of using paint to create a sheet with multiple colors, as shown in FIGS. 22A and 22B. In the prior art, a single polyurethane region 154 is coagulated onto a substrate 156 to form a sheet 158 including a coagulated region 160 having a top surface 168 and a bottom surface 170. To achieve regions of different color, a paint 162 having a top surface 164 and a bottom surface 166 would be applied to top surface 168 of coagulated polyurethane region 160 where desired. The polyurethane was coagulated prior to application of the paint and the paint would form a thin separate region over the surface of the coagulated polyurethane.

The prior art method of coating a coagulated region of polyurethane 160 with paint 162 alters the characteristics of sheet 158. As shown in FIG. 22A and in greater detail in FIG. 22B, paint 162 did not integrate with polyurethane region 154. Rather, bottom surface 166 of paint 162 bonds to top surface 168 of polyurethane region 154. In embodiments known to the Applicant, the paint coating the surface had different tactile characteristics from the polyurethane it coated, including different levels of tackiness or durometer. For example, painted grips are generally less tacky in the region covered by paint than in the unpainted regions of polyurethane. In addition, during use, the paint on the polyurethane may wear off giving the grip a weathered or worn appearance. Though valuable and unique, Applicant's other solutions for introducing contrasting characteristics (including the use of multiple sheets, strips and/or inserts) result in seams between the various components.

Embodiments created according to the above description allow for the manufacture of grips having regions of contrasting characteristics wherein the structure of the region is seamless. For example, a red polyurethane having a desired level of tackiness and durometer may be used in conjunction with a blue polyurethane having the same desired level of tackiness and durometer. The sheet formed from the two materials would include a uniquely colored pattern and a seamless structure having a substantially uniform level of tackiness and durometer.

Referring now to FIG. 23, there is shown a partial schematic cross-sectional view of sheet 112 taken along the line 23-23 in FIG. 19. Contrasting regions 150 and 152 are visible on top surface 144. Due to the movement of nozzle 136 relative to web 94 during the application of second polyurethane 102 onto top surface 96 of first polyurethane 92, as discussed above, differing amounts of second polyurethane 102 are applied in different areas or regions. As the polyurethanes mix, second polyurethane 102 settles into first polyurethane 92.

After water bath 108, coagulated region 112 defines a total thickness $t_{PolyT}$ between its top surface 144 and its bottom surface 114. In various regions, second polyurethane 102 extends from top surface 144 into coagulated region 112 with a thickness $t_{poly2}$. The ratio of $t_{Poly2}$ to $t_{polyT}$ may vary, depending on a number of factors including the speed with which web 94 passes below nozzle 136, the flow rate of second polyurethane 102 from nozzle 136, and the rate of movement of nozzle 136 in the X and Y directions. In some embodiments, the maximum and, preferably, the average ratio of $t_{Poly2}$ to $t_{PolyT}$ in some regions is at least 1 to 15, 1 to 10, 1 to 5, 1 to 4, 1 to 3, and/or 1 to 2. In some regions, the ratio is 1 to 1 where second polyurethane 102 extends from top surface 144 to bottom surface 114. In some embodiments, the ratio varies in different regions of sheet 80.

As discussed above, coagulated region 112 is generally porous. This porous region has a total thickness $t_{porousT}$ between top surface 144 and bottom surface 114 of coagulated region 112. In various regions, second polyurethane 102 extends from top surface 144 into porous coagulated region 112 with a maximum thickness $t_{porous2}$. The ratio of $t_{porous2}$ to $t_{porousT}$ may vary. In some embodiments, the maximum and, preferably, the average ratio of $t_{porous2}$ to $t_{porousT}$ in some regions is at least 1 to 50, 1 to 40, 1 to 30, 1 to 20, 1 to 15, 1 to 10, 1 to 5, 1 to 4, 1 to 3, and/or 1 to 2. In some regions, the ratio is 1 to 1 where second polyurethane 102 extends through porous coagulated region 112 from top surface 144 to bottom surface 114. In some embodiments, the ratio varies in different regions of sheet 80.

Pattern 142 shown in the figures is an example of the patterns achievable with Applicant's method of making the polyurethane sheet. Other patterns are also possible. For example, in some embodiments, nozzle 136 is held steady as second polyurethane 102 is applied to web 94 to create a solid band of second polyurethane 102 across upper surface 96 of first polyurethane 92. Depending on how sheet 80 is formed into layered sheet L2, the band may extend horizontally, vertically, or at an angle on layered sheet L2.

In some embodiments, top surface 96 of first polyurethane region 92 forms substantially all of top surface 144 of coagulated region 112. In such embodiments, relatively smaller quantities of second polyurethane 102 may be applied prior to the coagulation process. In other embodiments, top surface 106 of second polyurethane 102 forms substantially all of top surface 144 of coagulated region 112. In such embodiments, relatively large quantities of second polyurethane 102 may be applied prior to the coagulation process. Embodiments of the present inventions may include different regions of similar patterns. In some, the pattern may be repeated and positioned such that layered sheet L2 formed from the sheet includes at least three regions having contrasting characteristics, such as colors. In some embodiments, layered sheet L2 may be formed with at least 5 regions of contrasting characteristics. In some, there may be at least 7 regions of contrasting characteristics. In some, there may be 10 or more regions of contrasting characteristics. These regions of contrasting characteristics may be arranged throughout top surface 144 of coagulated region 112 of layered sheet L2, whether across the width of layered sheet L2, along the length of layered sheet L2, or in a combination of the two.

Referring now to FIG. 24, there is shown a partial schematic cross-sectional view of sheet 158 shown in FIGS. 22A and 22B. Coagulated region 160 is porous and includes generally smooth top surface 168 and bottom surface 170. Top surface 168 may include one or more irregularities 172 which may extend downward into coagulated region 160. Paint 162 is applied over top surface 168 of coagulated region 160. Due to irregularities 172 in top surface 168 of coagulated region 160, paint 162 may extend into coagulated region 160 with a thickness $t_{Porous2}$. Though unclear, the ratio of $t_{porous2}$ to $t_{PorousT}$ shown in FIG. 22B appears to be no more than 1 to 100. Thus, if the paint was a second polymer applied to the surface of a coagulated region, the ratio of $t_{porous2}$ to $t_{PorousT}$ of a paint covered sheet is far from the 1 to 50 ratio discussed above.

As shown in FIG. 25, sheet 80 may be formed into layered sheet L2. In some embodiments, layered sheet L2 is die cut from sheet 80. As will be understood by those of skill in the art, sheet 80 may be formed into any of a number of shapes, including strips, panels, inserts, or panels with cut-outs as may be appropriate for the particular application.

Like layered sheet L described above, layered sheet L2 includes a top surface 174, a top region A, a bottom region B, a first side region $C_1$, and a second side region $C_2$. A line drawn from top region A to bottom region B on at least a portion of top surface 174 preferably crosses multiple regions of polyurethane having a different characteristic. In some embodiments, layered sheet L2 may include at least 2, at least 3, at least 5, at least 7, or at least 10 regions having a different characteristic along the line drawn from top region A to bottom region B on at least a portion of top surface 174. In some embodiments, layered sheet L2 may include in the range of between 2 and 500 regions of at least one different characteristic along the line. It should be understood that the different characteristics of the regions may be alternating two or more colors along the line. Alternatively, the different characteristics of the regions may be alternating levels of other characteristics such as tackiness or durometer along the line.

Similarly, a line drawn from first side region $C_1$ to second side region $C_2$ on at least a portion of top surface 174 also will preferably cross multiple regions having different characteristics. In some embodiments, layered sheet L2 may include at least 2, at least 3, at least 5, at least 7, or at least 10 regions having a different characteristic along the line drawn from first side region $C_1$ to second side region $C_2$ on at least a portion of top surface 174. In some embodiments, layered sheet L2 may include in the range of between 2 and 500 regions of at least one different characteristic along the line.

Likewise, a line drawn into layered sheet L2 from top surface 174 to bottom surface 114 of coagulated region 112 may cross multiple regions. In some embodiments, layered sheet L2 may include at least 2, at least 3, at least 5, at least 7, or at least 10 regions having different characteristics along the line drawn from its top surface 174 to bottom surface 114 of coagulated region 112. In some embodiments, layered sheet L2 may include in the range of between 2 and 50 regions of at least one different characteristic along the line.

As will be understood by those of skill in the art, features of layered sheet L2 may be combined with features of layered sheet L discussed above as desired. For example, as discussed above with respect to the other layered sheets, layered sheet L2 may be further enhanced with a friction enhancing pattern.

FIG. 26 illustrates another step in the manufacture of embodiments of grip G. Layered sheet L is illustrated, but one of skill in the art will understand that similar steps may be taken with layered sheet L2. In some embodiments, bottom region B of layered sheet L is skived. Generally, top region A need not be skived as raised portion $R_2$ of tube T includes substantially axially extending surfaces 46b which engage top region A when layered sheet L is attached to tube T. It will be noted that, in some embodiments not shown, top region A of layered sheet L can be skived at various angles to accommodate different angles $\alpha_2$ of surface 46b as desired.

Figure 27:
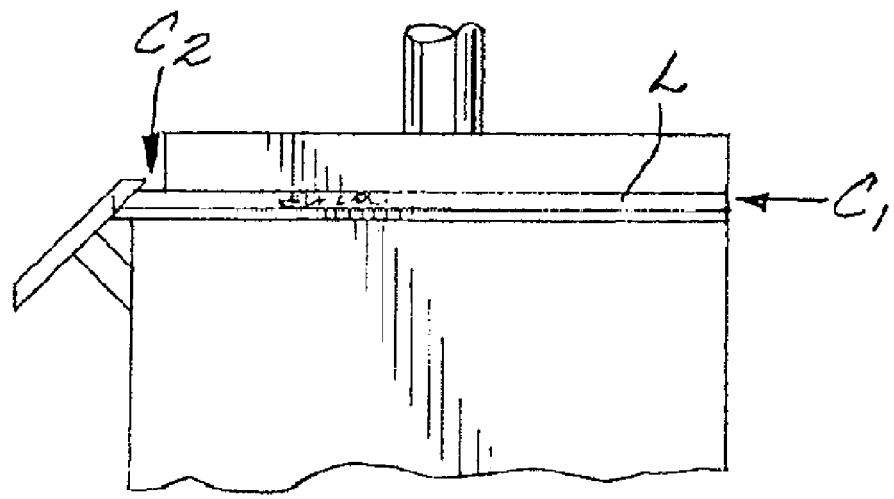
FIG. 27 shows a first side edge of a layered sheet being skived.
Figure 28:
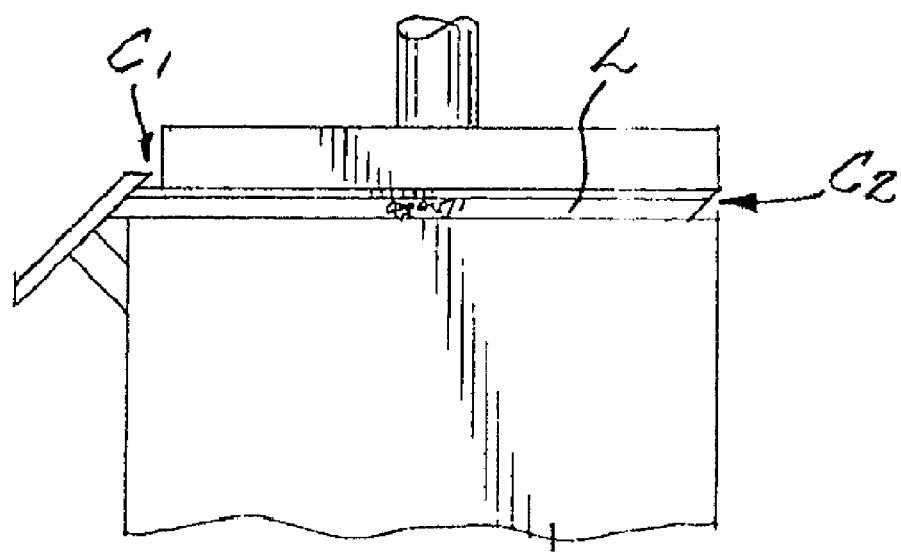
FIG. 28 shows a second side edge of the layered sheet shown in FIG. 27 being skived.
Figure 31:
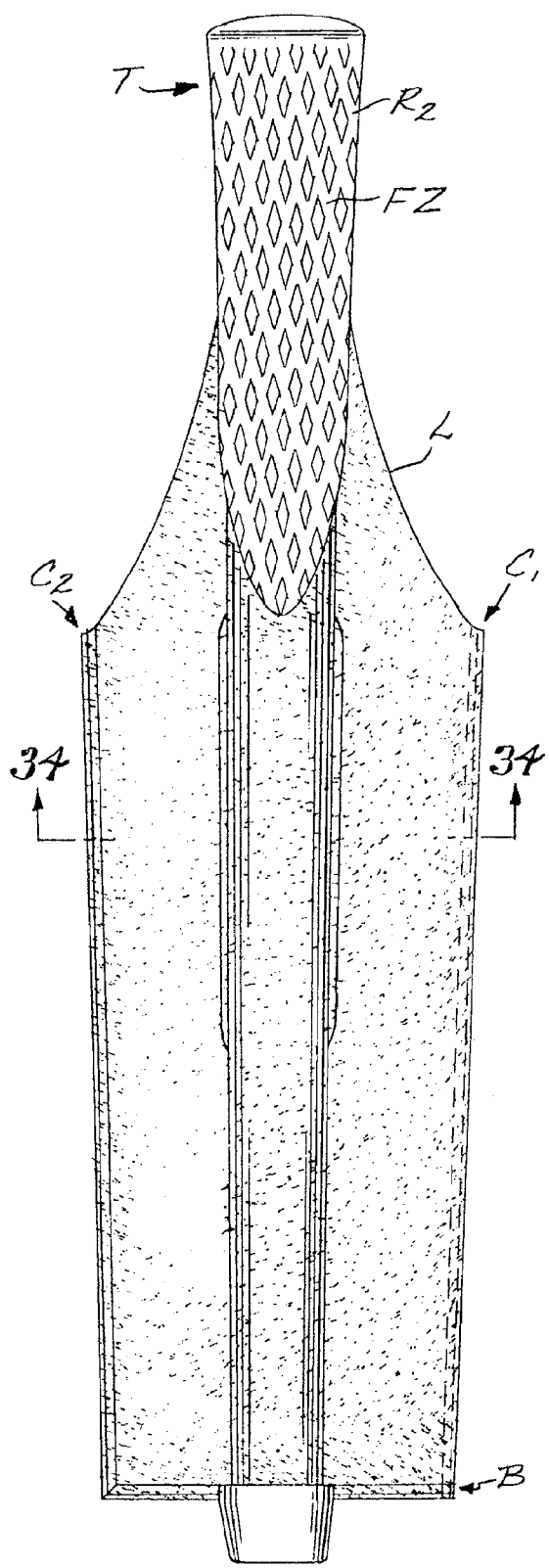
FIG. 31 is a side elevational view showing a step in wrapping and adhering a layered sheet to a tube.
Figure 32:
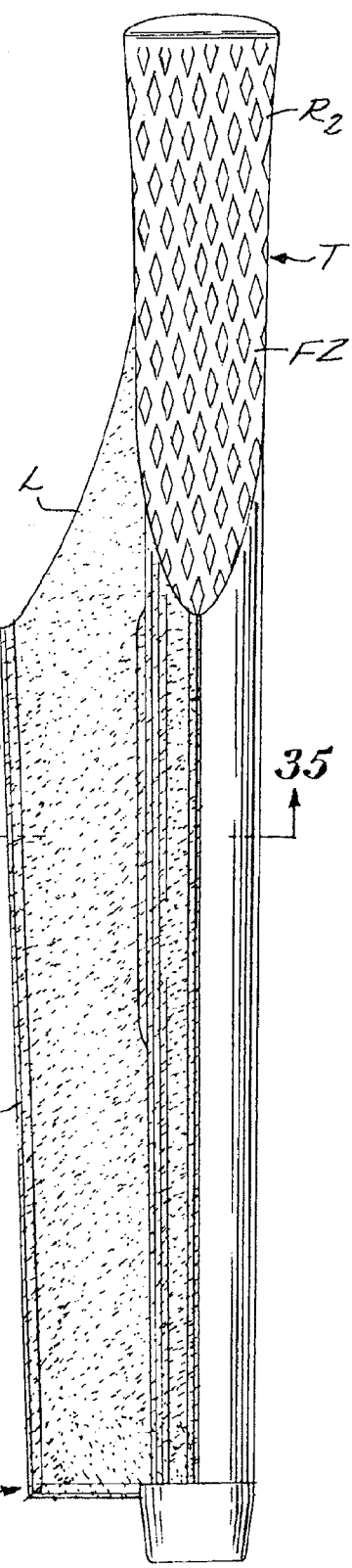
FIG. 32 is a side elevational view showing another step in wrapping a layered sheet around a tube.

FIGS. 27 and 28 illustrate another skiving step in the manufacture of embodiments of grip G. Side regions $C_1$ and $C_2$ are shown being skived such that they are substantially parallel to each other. Skiving side regions $C_1$ and $C_2$ in such a manner may facilitate the attachment of layered sheet L to tube T in certain embodiments as described in greater detail below. Other possible skiving configurations are possible in addition to leaving the side regions unskived.

Referring generally to the layered sheets disclosed herein, top surface 174 of layered sheet L is in direct contact with the hand of the user using a grip G. However, as one of skill in the art would appreciate, an additional coating region over layered sheet L may be included. It should be understood that the top surface of a grip embodying the disclosure presented above may also be coated, in whole or in part, by means of a brush, nozzle, spray or the like with a thin region of polyurethane and/or other material (not shown) to, for example, protect such surface, add tackiness thereto, and/or increase the durability thereof. The additional coating region is preferably transparent, or semi-transparent, such that some or all of any visual pattern on the outer surface of layered sheet L remains visible. The additional coating region may be somewhat opaque, as long as a portion of the layered sheet L is observable through the additional coating region. The additional coating region may be incorporated into a previously formed grip G or may be applied to the layered sheet L prior to attachment to tube T. If used, the additional coating region would be in direct contact with the user's hand rather than the top surface of the layered sheet. However, even when an additional coating region is included, the top surface of the layered sheet L is considered to be the top surface of the grip G. If an additional coating region is included over the top surface of the grip, this region may also be further enhanced with a friction enhancing pattern as discussed herein.

Referring now to FIGS. 29 through 42, layered sheet L is shown being applied to tube T to form grip G. In FIG. 29 the inner surface of layer 50 is shown receiving an adhesive 180 by means of a nozzle, brush or the like. In FIG. 30 support surface 12 of tube T is shown receiving an adhesive 180 by means of a nozzle, brush or the like. In some embodiments, adhesive 180 is applied to either layered sheet L or tube T.

FIGS. 31 through 42 shows the layered sheet L being wrapped around and adhered to tube T. Combined layered sheet L and tube T form grip G (FIG. 33). As the manufacturing process progresses, tube T will generally be temporarily supported on a collapsible mandrel (not shown) in a conventional manner. During the wrapping operation, bottom region B of layered sheet L will desirably be manually inserted within slot 30 of ring 8. Raised portion $R_1$ desirably fits within cut-out 184 and is desirably substantially engaged by edge 190 of cut-out 184. Top region A, defined in part by edge 192, is configured to correspond to raised portion $R_2$. When layered sheet L is wrapped about support surface 12, raised portion $R_2$ desirably engages edge 192 in the upper portion of the grip G.

In some embodiments, side regions $C_1$ and $C_2$ cooperate to form a seam 200 extending generally along the longitudinal axis of tube T. As shown in FIGS. 31 through 39, in some embodiments the side regions $C_1$ and $C_2$ are skived in a substantially parallel fashion such that they overlap along the seam 200. In such embodiments, inner layer 50 of side region $C_1$ preferably corresponds to inner layer 50 of side region $C_2$ and outer layer 52 of side region $C_1$ preferably corresponds to outer layer 52 of side region $C_2$ to form a strong and relatively smooth seam. Other possible seams 200 may be formed. For example, un-skived side regions $C_1$ and $C_2$ may be adhered or bonded together. Alternatively, side regions $C_1$ and $C_2$ may be stitched together to form the seam 200. In some embodiments, side regions $C_1$ and $C_2$ are skived from the center of layered sheet L toward the outer regions of layered sheet L in an anti-parallel fashion and subsequently joined to form seam 200. Such skiving may start at inner layer 50 and extend through outer layer 52, leaving a thin layer of outer layer 52 at the outer portion of side regions $C_1$ and $C_2$. In some embodiments, a groove (not shown) may be formed along seam 200 to further enhance seam 200. In some embodiments, seam 200 may include, in addition to adhesive 180, a deposit of polyurethane 202 to assist in bonding or adhering layered sheet L, and in particular outer layers 52 of layered sheet L. Such polyurethane 202 may be deposited with a nozzle or other means known to those of skill in the art (see, e.g., FIG. 39). After the polyurethane hardens, in some embodiments the polyurethane may be buffed by a suitable brush or the like to smoothly blend the surface of the grip while in other embodiments, the polyurethane is not buffed.

Gripping surface GS includes outer surface 174 of layered sheet L, exposed surface $E_1$ and exposed surface $E_2$. In general, in embodiments layered sheet L is wrapped around tube T such that layered sheet L abuts connecting surface 46 of raised portion R at an intersection 178, wherein at least a portion of inner layer 50 and/or at least a portion of outer layer 52 abut connecting surface 46 of raised portion R. Desirably, inner layer 50 of layered sheet L is further adhered to support surface 12 of tube T1.

As shown, for example in FIGS. 40 through 42, inner layer 50 is desirably adhered or bonded to support surface 12 and to connecting surfaces 46a and 46b of raised portions $R_1$ and $R_2$. Outer layer 52 is also desirably adhered or bonded to connecting surfaces 46a and 46b of raised portions $R_1$ and $R_2$. Layered sheet L will be adhered to the raised portion R by one or more suitable adhesives 180. A suitable adhesive has a mixture of AD-86 (Toluene, 35%; Methyl Ethyl Ketone, 50%; Polyurethane, 15%) and AD-RFE (Ethyl Acetate, 78%; Polyisocynate, 22%). In some embodiments, and particularly in those wherein outer layer 52 comprises a polyurethane, intersections 178 between layered sheet L and tube T may include, in addition to adhesive 180, a deposit of polyurethane 202 to assist in bonding or adhering layered sheet L, and in particular outer layer 52 of layered sheet L to raised portion R. Such polyurethane 202 may be deposited with a nozzle or other means known to those of skill in the art (see, e.g., FIG. 42). After the polyurethane hardens, in some embodiments the polyurethane may be buffed by a suitable brush or the like to smoothly blend the surface of the grip while in other embodiments, the polyurethane is not buffed. The proximity of layered sheet L to raised portion R may not be uniform. For example, in some embodiments, portions of raised portion R may be within approximately ⅛ inch, 1/16 inch or in direct contact with the layered sheet L around substantially the entire circumference of the raised portion R.

In certain embodiments, thickness $t_R$ of raised portion R is generally constant along its entirety and is configured to be approximately equal to thickness $t_L$ of the layered sheet L (see, e.g., FIG. 40). In some embodiments, the approximately equal thicknesses of portion R and layered sheet L promote a substantially smooth surface interface 176 between the two as they cooperate to define gripping surface GS of grip G.

As mentioned above, it should be understood that the outer surface of a grip embodying the disclosure herein may be coated by means of a brush or spray or the like with a thin layer of polymer such as polyurethane (not shown) to, for example, protect such surface, add tackiness thereto and/or increase the durability thereof.

In some embodiments, tube T includes rubber with an IRHD hardness rating (International Rubber Hardness Degrees) between approximately 60 and 80 degrees. In some embodiments, raised portion R also has an IRHD hardness rating between approximately 60 and 80 degrees. As discussed above, in some embodiments outer layer 52 includes polyurethane. In some embodiments, outer layer 52 has an IRHD hardness rating of between approximately 40 and 60 degrees. In some embodiments, the ratio of the hardness of outer layer 52 and raised portion R is approximately 1 to 1. In some embodiments, the hardness ratio is between approximately 1 to 2 and approximately 1 to 1. In some embodiments where the hardness ratio is approximately 1 to 1, one or more other characteristics, such as tackiness, durability, color, or friction enhancing pattern on the outer surface, may differentiate raised portion R and outer layer 52 on the gripping surface.

In one application, layered sheet L is adapted to provide a tacky, shock absorbing surface while raised portions R are configured to provide more durable surfaces. A user grasps the grip G with her left hand closest to cover 10. At least a portion of finger zone FZ of raised portion $R_2$ engages at least a portion of the pads of a user's fingers closest to the user's left palm. The upper portion of $R_2$ may extend a width $w_2$ sufficient to provide a palm zone PZ on the front of grip G adapted to engage the meaty portion of the palm of the user's left hand. In some embodiments, that width $w_2$ extends 100% of the circumference of tube T. The user's left and right thumbs may then rest on the front of grip G where raised portion $R_1$ is configured to engage the thumbs.

Figure 45:
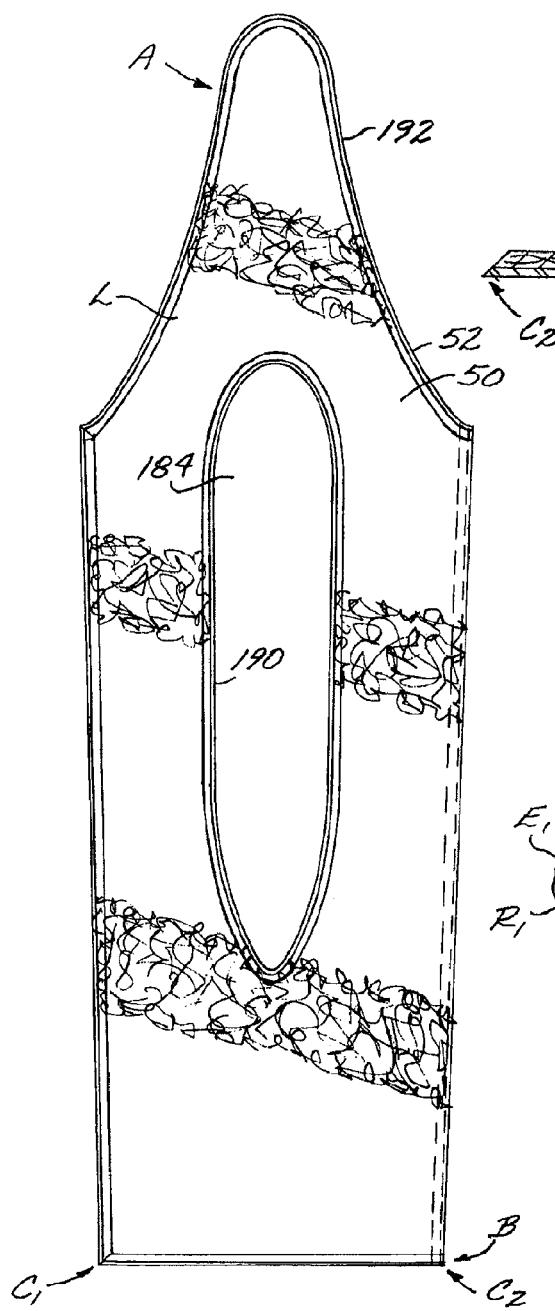
FIG. 45 is a rear view of a layered sheet of a grip according to some embodiments.
Figure 46:
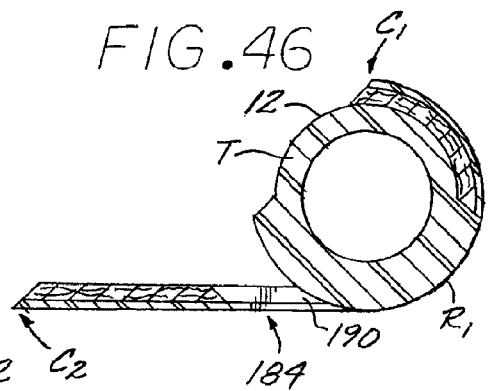
FIG. 46 is a horizontal sectional view of a layered sheet being wrapped around a tube according to some embodiments.
Figure 47:
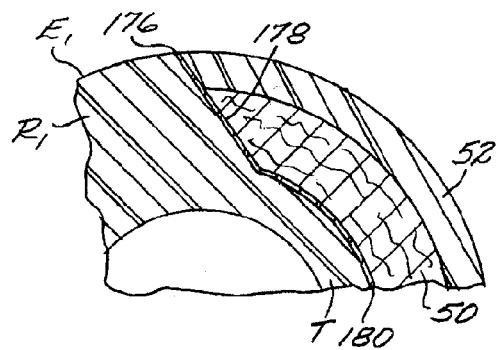
FIG. 47 is a partial cross-sectional view of a layered sheet bonded to a tube and a raised portion thereof according to some embodiments.

FIGS. 43 through 47 illustrate a modified tube T and layered sheet L. As discussed above, in general connecting surface 46 desirably extends between support surface 12 and exposed surface E of raised portion R and forms an angle α with a line tangent to the intersection of connecting surface 46 of raised portion R and support surface 12 of tube T. Layered sheet L is generally configured to engage connecting surface 46. As shown in, for example FIG. 44, connecting surface 46a extends between support surface 12 and exposed surface $E_1$ of raised portion $R_1$ to form an angle $α_1$. In some embodiments, connecting surface 46 is transverse to support surface 12 such that angle α is approximately 90 degrees and edges 190 and 192 of layered sheet L are not skived so that they form a complementary angle. In some embodiments, it may be advantageous to configure tube T such that angle α is greater than 90 degrees. In some embodiments, angle α is in the range of approximately 90 and 175 degrees. In some embodiments, angle α is in the range of approximately 95 and 150 degrees. In some embodiments, for example the embodiment shown in FIGS. 43 through 47, angle α is approximately 120 degrees. FIG. 45 illustrates layered sheet L after being skived along its edges to complement the angle α of tube T illustrated in FIGS. 43 and 44. FIGS. 46 and 47 show layered sheet L being wrapped about tube T and bonded to tube T as described above.

Alternatively, it may be advantageous to configure tube T such that angle α is less than 90 degrees (not shown). In some embodiments, angle α is in the range of approximately 5 and 90 degrees. In some embodiments, angle α is in the range of approximately 25 and 85 degrees. Forming connecting surface 46 of raised portion R to have an angle α less than 90 degrees allows the edges of layered sheet L to be hidden beneath at least a portion of connecting surface 46, particularly if thickness $t_R$ of raised portion R is greater than thickness $t_L$ of layered sheet L. In some embodiments, connecting surface 46 describes an angle α other than 90 degrees, and yet some or all of the edges of layered sheet L are not skived to complement the angle α described by connecting surface 46. In some such embodiments, particularly in those wherein angle α is less than 90 degrees, gaps between layered sheet L and raised portion R may be left empty or filled with an adhesive or other bonding agent.

In some embodiments, connecting surface 46 describes a varied angle α. The edges of layered sheet L may have skiving to complement some or all of those angles.

In addition to being attached to tube T configured for use with irons, as shown in FIG. 2, any of the layered sheets disclosed herein may also be attached to a tube configured for use with putters (not shown). Such a putter tube may include a substantially flat region as shown, for example, in Applicant's U.S. Pat. Nos. 6,843,732 and 6,857,971. In addition, in such a putter grip, alternative arrangements of raised portions R may be employed to accommodate various types of putting styles. For example, an additional finger zone FZ may be created on the front of the grip and a thumb zone TZ may be created on the back of the grip accommodate a player's "claw style" putting grip.

It will be understood that the foregoing is only illustrative of the principles of the inventions, and that various modifications, alterations and combinations can be made by those skilled in the art without departing from the scope and spirit of the inventions.

Figure 48:
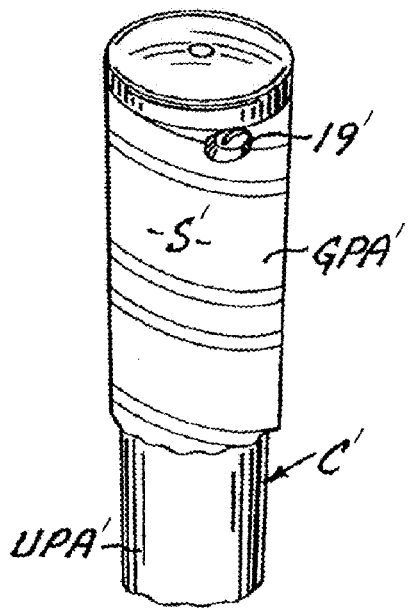
FIG. 48 is a broken perspective view showing the upper portion of a spirally-wrapped prior art golf club grip starting to unravel from the handle of a golf club.
Figure 49:
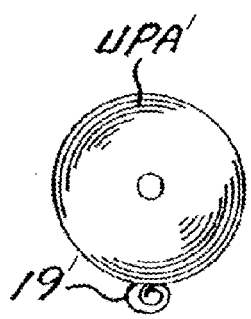
FIG. 49 is a top plan view of the golf club grip shown in FIG. 48.
Figure 50:
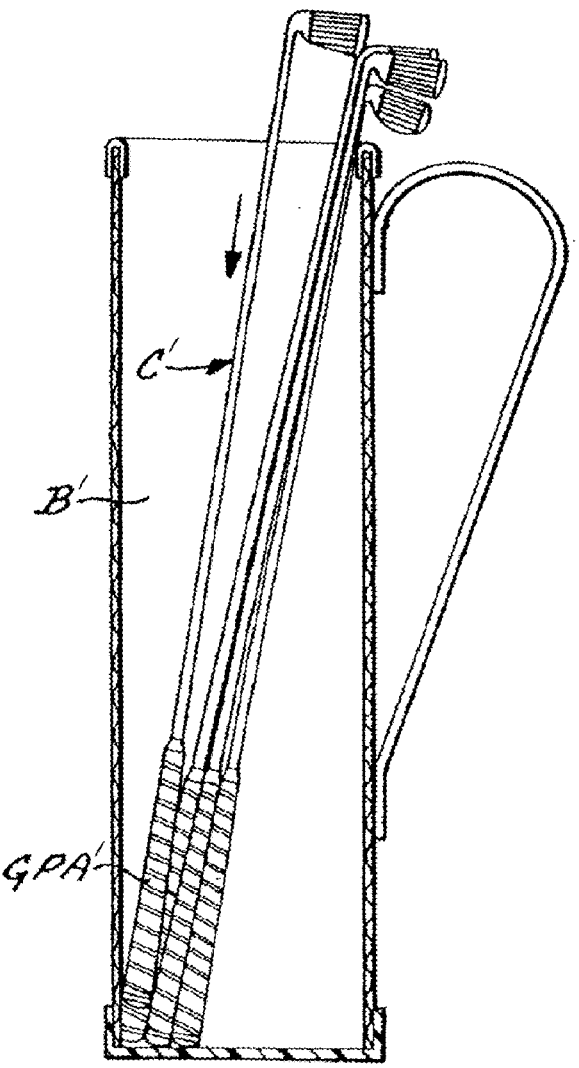
FIG. 50 is a cut-away side view showing a golf club provided with a prior art golf club grip being inserted into a golf bag resulting in the unraveling of FIGS. 48 and 49.

Referring to the drawings, FIGS. 48, 49 and 50 show a golf club C' having a shaft 20' upon the handle H' of which is installed a prior art resilient grip GPA'. Grip GPA' includes a polyurethane-felt strip S' which is spirally wrapped about a resilient underlisting UPA' similar to that shown and described in my U.S. Pat. No. 6,386,989. A plurality of such prior art golf club grips are inserted into and removed form a conventional golf bag B' during play. As noted in FIG. 50, during such insertion and removal, the grips GPA' of the golf clubs have sliding contact with other golf club grips and the sides of the golf bag B'. Such contact causes the upper end of the resilient strips to unravel from the golf club handles. In FIGS. 48 and 49 there is shown the manner in which unraveling of the upper end 19' of resilient strip S' takes place. Such unraveling not only detracts from the appearance of the grip, but is also distracting to a golfer when he takes a swing of the club because of the rough feel of the unraveled portion of the strip.

Referring now to FIGS. 51-59, there are shown the components of a preferred form of golf club grip G' embodying the present invention. Such grip includes resilient underlisting sleeve similar to that described in my U.S. Pat. No. 6,386,989. Sleeve U' includes an integral cap 22' at its upper end, while the lower end of the sleeve is formed with an integral nipple 24'. The upper portion of nipple 24' is formed with a circumferential groove 25' for a purpose described hereinafter. It should be particularly noted that the underside of cap 22' is formed with a circumferentially extending slot 26' which receives the upper end of the resilient sleeve S' of FIGS. 55-58 in a manner to be described hereinafter.

More particularly, strip S' is fabricated from first and second individual segments S1' and S2' of different widths, with segment S1' preferably being wider than segment S2'. Segment S1' includes a bottom backing layer, 30' (preferably of felt) having an inner or bottom surface which is adhered to the aforedescribed underlisting sleeve U'. Segment S1' also includes a top layer of a suitable resilient plastic material, such as a smooth closed-pore polyurethane layer, generally designated 34', with the polyurethane layer being bonded to the upper surface of its adjacent bottom layer. The segment S1' may be formed with vertical air-passing perforations (not shown) such as described in my U.S. Pat. No. 5,645,501 issued Jul. 8, 1997. Segment S2' is similar in construction to segment S1' and includes an open-pored bottom backing layer, generally designated 36' (preferably of felt), having an inner or bottom surface which is adhered to underlisting sleeve U'. Segment S2' also includes a top layer 40' of a suitable resilient plastic material such as polyurethane layer, with the polyurethane layer being bonded to the upper surface of its adjacent backing layer 36'. The polyurethane layer of each strip segment S1' and S2' may be formed in a conventional manner by coating a felt strip with one or more solutions of polyurethane (e.g., polyester or polyether) dissolved in a dimethyl formamide (DMF), immersing the coated strip in water baths to displace the DMF and cause the urethane to coagulate, and finally driving off the water by the application of pressure and heat. In this manner, pores are formed in the polyurethane layer, while the underside of the polyurethane layer is bonded to the upper surface of the felt layer. The thickness of the polyurethane layer is preferably about 0.2-1.40 millimeters and the thickness of the felt layer is about 0.7-1.90 millimeters.

The felt layers 30' and 36' serve as backing layers for the polyurethane layer 34' and polyurethane coating 40' so as to provide strength for the polyurethane. The felt also cooperates with the polyurethane to assist in cushioning the shocks applied to a grip when a golf ball is struck by a golf club. It should be noted that other materials may be substituted for the felt as a backing layer to provide strength for the polyurethane and to cushion shocks, e.g., a synthetic plastic such as an ethylene-vinyl acetate copolymer, commonly known as EVA. The felt may be fabricated of conventional suitable materials such as nylon, cotton, polyester or the like.

The entire underside of backing layer 30' of segment S1' is provided with an adhesive 54' initially covered in a conventional manner by a peel-away tape 56'. Peel-away tape 56' includes a thin band 56B' (not shown) which can be pulled off the main body of tape 56' to expose adhesive 54' disposed on one edge of segment S1', while the tapes' main body remains on the adhesive covering the remainder of the segment S1'.

Referring now to FIG. 58, the side edges of the polyurethane layer 34' of segment S1' are formed with sidewardly and outwardly extending reinforcement side edges 46' and 47'. The side edges of the polyurethane layer 40' of segment S2' are also formed with sidewardly and outwardly extending reinforcement side edges 48' and 49'. In FIG. 58, the side edges of the felt layer 34' of segment S1' have been skived to form outwardly and upwardly slanted side edges 50' and 51'. Similarly, the side edges of felt layer of segment S2' have been skived to form outwardly and upwardly slanted side edges 52' and 53'. The underside of segment S2' is covered with an adhesive 58' initially covered by a peel-away tape 59' (FIG. 56). To combine segments S1' and S2' into composite strip S', reinforced side edge 49' of segment S2' is then placed underneath skived side edge 50' of segment S1' as shown in FIG. 58 and pressed onto segment S1'. The strip S' is then cut on both ends to provide the leading edge and trailing edges 60' and 62'.

It should be particularly noted that the upper area of polyurethane layer 40' of segment S2' inwardly of the recessed side edges may be embossed with depressed indicia I', such as the name of the manufacturer of the golf club grip. Such embossing serves not only as a decorative enhancement of the golf club grip, but additionally, the embossing process densifies the polyurethane layer 40' so as to reduce stretching of the second segment and thereby increase the hoop strength of the strip S'. It is also desirable to mold the polyurethane layer 34' of segment S1' in a first color while polyurethane layer 40' of segment S2' is molded in a second color that contrasts with the first color. With this arrangement, a multicolored grip having a pleasing appearance will result when the strip S' is spirally wrapped about an underlisting sleeve.

Figure 63:
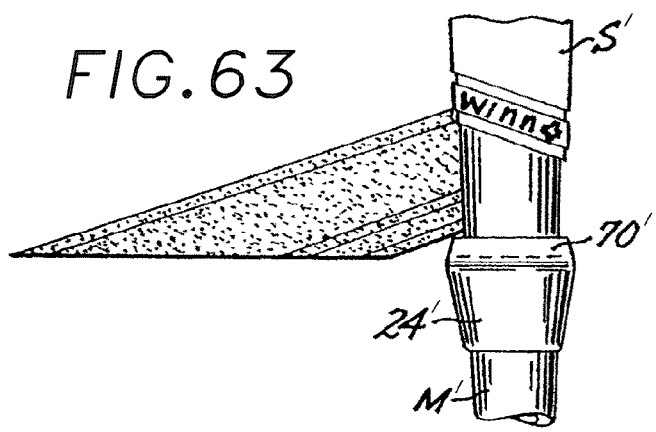
FIGS. 63, 64, and 65 are broken side elevational views showing the lower portion of the resilient sleeve being spirally wrapped around and secured to the lower portion of the underlisting sleeve.
Figure 64:
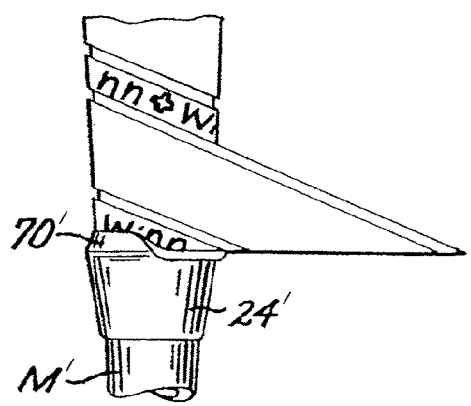
Figure 65:
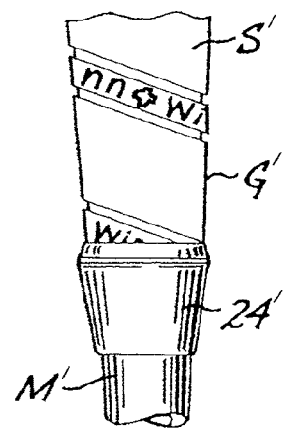
Figure 66:
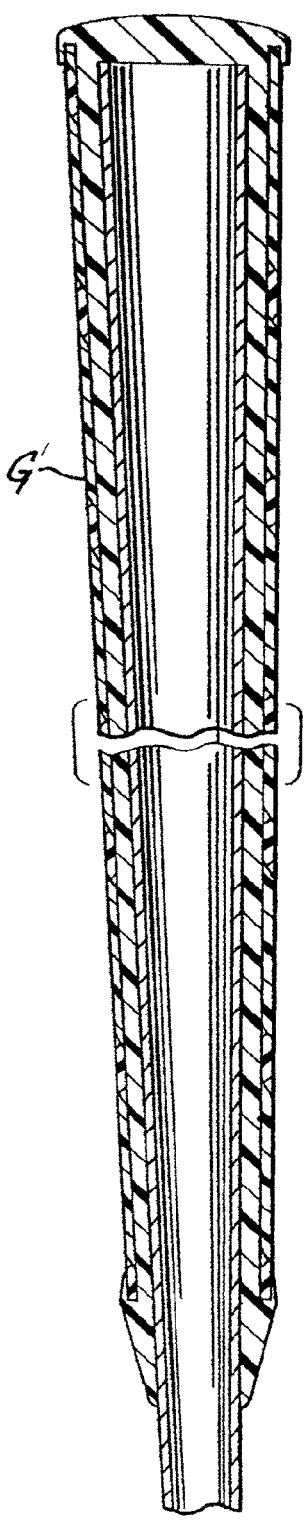
FIG. 66 is a vertical cross-sectional view of grip embodying the present invention.

Referring now to FIGS. 59-62, to secure the upper or leading edge 60' of resilient strip S' within the circumferential slot 26' of cap 22', the upper edge of the strip is manually urged into the confines of the slot 26' (FIG. 60). After the upper edge of the strip S' has been firmly positioned within the slot 26', the strip is spirally wrapped downwardly along the outer surface of the underlisting sleeve U' (FIG. 61). When the strip S' has been spirally wound to a position wherein its lower or trailing edge 62' is disposed in horizontal alignment with the lower portion of nipple groove 25' the lower end portion of the strip is manually urged into the confines of the groove by temporarily expanding the peripheral lip 70' formed outwardly of the groove so as to admit the lower edge of the strip into the groove. When the lip 70' returns to its original position, the lip will securely retain the lower end of the strip to the upper portion of the nipple as shown in FIGS. 63-65. The resulting grip G' embodying the present invention is shown in FIG. 66. Referring thereto, it will be seen that the upper end of strip S' is restrained against unraveling by being locked in cap slot 26' while the lower end of such strip is restrained against unraveling by nipple lip 70'. The aforedescribed arrangement for securing the upper edge of the strip S' is particularly useful in securely retaining a two-piece strip on the upper portion of the underlisting sleeve since the narrower strip segment has a tendency to become unraveled.

The spiral wrapping of the strip S' about the underlisting U', and the positioning of the upper and lower edges of the strip within the slot 26' and groove 25' may take place when the underlisting sleeve is positioned upon a mandrel M' in a conventional manner. After the strip has been secured upon the underlisting U', the sleeve and strip combination may be removed from the mandrel and slipped onto the handle portion of a golf club shaft.

It should be understood that various modifications and changes may be made with respect to the above-described embodiment without departing from the scope of the present invention. By way of example, the resilient strip may be of one-piece construction such as that shown in my aforementioned U.S. Pat. No. 6,386,989, rather than the two segment construction described hereinabove.

What is claimed is:

1. A grip for use with a golf club, said grip comprising:
   a tube having a body with a first end, a second end including a cover defining a substantially closed outer surface, a support surface positioned between said first and second ends and a raised portion extending outwards from said support surface and integrally formed with said support surface, said tube defining three regions of equal length extending from said first end to said second end including a first region adjacent the first end, a second region adjacent the second end, and a middle region between the first and second ends;
   said first end comprising a lip extending toward said second end, said lip having an inner and an outer surface wherein said inner surface cooperates with a first portion of said support surface to form a slot;
   said raised portion including an exposed surface and a connecting surface extending between said support surface and said exposed surface, a first section of said raised portion integrally formed with said cover and having a length of at least about one half inch extending around the circumference of said tube such that said raised portion forms a portion of a gripping surface configured to be gripped by a user in the second region, and a second section of said raised portion extending along said body toward said first end, said second section extending to and ending in an elliptical-like point in the first region, and said second section having a circumferential width of no more than about 50% of the circumference of said tube body in the middle region of said tube body; and
   a multilayered sheet comprising an inner layer and an outer layer, said multilayered sheet configured to overlay said support surface and not said exposed surface of said raised portion;
   said multilayered sheet being wrapped about said tube such that said multilayered sheet contacts said support surface of said tube and wraps entirely around the circumference of said tube body near said first end; and
   said inner layer of said multilayered sheet being adhered to said support surface, wherein said outer surface of said multilayered sheet and said exposed surface of said raised portion cooperate to define the a gripping surface.

2. A grip as in claim 1, wherein a portion of said first section of said raised portion extends a minimum of at least approximately 2 inches toward said first end.

3. A grip as in claim 1, wherein a portion of said multilayered sheet is configured to be inserted into said slot.

4. A grip as in claim 1, wherein said first end further defines an opening configured to couple with the shaft of a golf club.

5. A grip as in claim 1, wherein said exposed surface of said raised portion includes a friction enhancing pattern.

6. A grip as in claim 1, wherein said outer surface of said multilayered sheet includes a friction enhancing pattern.

7. A grip as in claim 1, wherein said first and second sections of said raised portion are separated by at least a portion of said support surface.

8. A grip as in claim 7, wherein said second section is generally shaped in the form of an ellipse having its long axis extending along the length of said body and having a second elliptical-like end located in said second region.

9. A grip as in claim 1, wherein at least one outer edge region of said sheet is skived.

10. A grip as in claim 1, wherein said connecting surface is transverse to said support surface.

11. A grip as in claim 1, wherein said connecting surface defines an angle with said support surface in the range of approximately 90 degrees and 175 degrees.

12. A grip as in claim 1, wherein said connecting surface defines an angle with said support surface in the range of approximately 95 degrees and 150 degrees.

13. A grip as in claim 1, wherein at least a portion of said connecting surface defines an angle with said support surface in the range of approximately 5 degrees and 90 degrees.

14. A grip as in claim 1, wherein at least a portion of said connecting surface defines an angle with said support surface in the range of approximately 25 degrees and 85 degrees.

15. A grip as in claim 1, wherein said tube comprises a molded material.

16. A grip as in claim 1, wherein said tube comprises a molded rubber.

17. A grip as in claim 1, wherein said lip and said tube are integrally formed.

18. A grip as in claim 1, wherein said inner layer of said sheet being adhered to said connecting surface is not skived.

* * * * *

UNITED STATES PATENT AND TRADEMARK OFFICE
CERTIFICATE OF CORRECTION

| | | Page 1 of 1 |
|---|---|---|
| PATENT NO. | : 8,360,898 B2 | |
| APPLICATION NO. | : 12/767736 | |
| DATED | : January 29, 2013 | |
| INVENTOR(S) | : Huang | |

It is certified that error appears in the above-identified patent and that said Letters Patent is hereby corrected as shown below:

On the Title Page

In column 2 (page 3 item 56) at line 12, Under Foreign Patent Documents, change "12/1999" to --12/1991--.

In the Specification

In column 1 at line 14 (approx.), Change "7,137,904," to --7,137,904.--.

In column 5 at line 12, Change "embodiments." to --embodiments;--.

In column 10 at line 7, Change "dimethyl formahide" to --dimethyl formamide--.

In column 11 at line 49, Change "forth," to --fourth,--.

In column 13 at line 54, Change "$t_{poly2}$" to --$t_{Poly2}$--. (1st occurrence)

In column 13 at line 54, Change "$t_{polyT}$" to --$t_{PolyT}$--.

In column 13 at line 66, Change "$t_{porousT}$" to --$t_{PorousT}$--.

In column 14 at line 3, Change "$t_{porous2}$." to --$t_{Porous2}$.--.

In column 14 at line 3, Change "$t_{porous2}$" to --$t_{Porous2}$--.

In column 14 at line 4, Change "$t_{porousT}$" to --$t_{PorousT}$--.

In column 14 at line 5, Change "$t_{porous2}$" to --$t_{Porous2}$--.

In column 14 at line 5, Change "$t_{porousT}$" to --$t_{PorousT}$--.

In column 14 at line 52, Change "$t_{porous2}$" to --$t_{Porous2}$--.

In column 14 at line 55, Change "$t_{porous2}$" to --$t_{Porous2}$--.

In column 17 at line 19, Change "Polyisocynate," to --Polyisocyanate,--.

In column 18 at line 48, Change "$t_L$," to --$t_L$--.

In column 19 at line 30, After "sleeve" insert --U',--.

In the Claims

In column 22 at line 12, In Claim 1, After "the" delete "a".

Signed and Sealed this
Seventh Day of January, 2014

Margaret A. Focarino
*Commissioner for Patents of the United States Patent and Trademark Office*